United States Patent
Wiseman et al.

(10) Patent No.: US 9,111,537 B1
(45) Date of Patent: *Aug. 18, 2015

(54) REAL-TIME AUDIO RECOGNITION PROTOCOL

(71) Applicant: Google Inc., Mountain View, CA (US)

(72) Inventors: Matthew Wiseman, San Francisco, CA (US); Yaniv Bernstein, Brunswick East (AU); Daniel Switkin, Booklyn, NY (US); Gheorghe M. Postelnicu, Zurich (CH); Matthew Sharifi, Palo Alto, CA (US); Annie Chen, Thalwil (CH); Dominik Roblek, Kilchberg ZH (CH)

(73) Assignee: Google Inc., Mountain View, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/325,002

(22) Filed: Jul. 7, 2014

Related U.S. Application Data

(63) Continuation of application No. 13/404,978, filed on Feb. 24, 2012, now Pat. No. 8,805,683.

(51) Int. Cl.
*H04M 11/00* (2006.01)
*G10L 15/22* (2006.01)

(52) U.S. Cl.
CPC ...................... *G10L 15/22* (2013.01)

(58) Field of Classification Search
USPC ................. 379/88.13–88.14, 88.01
See application file for complete search history.

(56) References Cited

U.S. PATENT DOCUMENTS

| | | |
|---|---|---|
| 7,043,473 B1 | 5/2006 | Rassool et al. |
| 7,489,767 B2 * | 2/2009 | Hikishima ................. 379/88.14 |
| 7,518,052 B2 | 4/2009 | Kourbatov |
| 7,796,635 B2 | 9/2010 | Nakata |
| 8,115,089 B2 | 2/2012 | Saino et al. |
| 8,116,746 B2 | 2/2012 | Lu et al. |
| 2002/0069073 A1 | 6/2002 | Fasciano |
| 2002/0072982 A1 | 6/2002 | Barton et al. |
| 2002/0086269 A1 | 7/2002 | Shpiro |
| 2002/0198789 A1 | 12/2002 | Waldman |
| 2003/0037010 A1 | 2/2003 | Schmelzer |
| 2003/0233930 A1 | 12/2003 | Ozick |
| 2004/0190687 A1 | 9/2004 | Baker |

(Continued)

OTHER PUBLICATIONS

"Pitch detection algorithm," Wikipedia, last modified on Feb. 24, 2014, 4 pages, [online][retrieved on Jul. 9, 2014] Retrieved from the internet <URL:http://en.wikipedia.org/wiki/Pitch detection algorithm>.

(Continued)

*Primary Examiner* — Simon Sing
(74) *Attorney, Agent, or Firm* — Amin, Turocy & Watson, LLP

(57) ABSTRACT

An audio recognition service recognizes an audio sample across multiple content types. At least a partial set of results generated by the service are returned to a client while the audio sample is still being recorded and/or transmitted. The client additionally displays the results in real-time or near real-time to the user. The audio sample can be sent over a first HTTP connection and the results can be returned over a second HTTP connection. The audio recognition service further processes check-in selections received from the client for content items indicated by the results. Responsive to receiving the check-in selections, the service determines whether a user is eligible for a reward. If the user is eligible, the service provides the reward.

20 Claims, 14 Drawing Sheets

(56) References Cited

U.S. PATENT DOCUMENTS

| | | | |
|---|---|---|---|
| 2005/0010407 A1* | 1/2005 | Jaroker | 704/235 |
| 2005/0281410 A1 | 12/2005 | Grosvenor | |
| 2006/0235864 A1 | 10/2006 | Hotelling et al. | |
| 2007/0038446 A1 | 2/2007 | Shen et al. | |
| 2007/0083537 A1 | 4/2007 | Martinez | |
| 2007/0131094 A1 | 6/2007 | Kemp | |
| 2007/0280225 A1 | 12/2007 | Forbes et al. | |
| 2008/0221881 A1 | 9/2008 | Carraux et al. | |
| 2008/0223200 A1 | 9/2008 | Kwak | |
| 2009/0025540 A1 | 1/2009 | Hillborg | |
| 2010/0042647 A1* | 2/2010 | Schultz et al. | 707/104.1 |
| 2010/0228546 A1* | 9/2010 | Dingler et al. | 704/235 |
| 2012/0139951 A1 | 6/2012 | Hwang et al. | |

OTHER PUBLICATIONS

Ellis, et al., "The 2007 Labrosa Cover Song Detection System," Music Information Retrieval Evaluation eXchange (MIREX), Australian Computer Society, 2007, 4 Pages.

Jensen, J., et al., "A Tempo-Insensitive Distance Measure for Cover Song Identification Based on Chroma Features," Proc. IEEE Int. Conf. Acoust., Speech, Signal Processing, 2008, pp. 2209-2212.

Katsiamia, A.G., et. al., "Practical Gammatone-Like Filters for Auditory Processing," EURASIP Journal on Audio, Speech, and Music Processing, v. 2007, Article ID 63685, 15 pages.

Lyon, R., "A Computational Model of Filtering, Detection, and Compression in the Cochlea", Proceedings IEEE International Conference on Acoustics, Speech, and Signal Processing, Paris, May 1982, pp. 1282-1285.

Patterson, R., "Auditory Images: How Complex Sounds are Represented in the Auditory System," Acoustical Science and Technology, Jpn, 2000, pp. 183-190,(E) 21, 4.

Serra, J., et al., "Audio Cover Song Identification and Similarity: Background, Approaches, Evaluation, and Beyond," Advances in Music Information Retrieval, SCI 274, 2010, pp. 307-332.

Weintraub, M., "The GRASP Sound Separation System", Proceedings IEEE International Conference on Acoustics, Speech, and Signal Processing, San Diego, Mar. 1984, pp. 18A.6.1-18A.6.4.

Egorov, A., et al., "Cover Song Identification with IF-F0 Pitch Class Profiles," MIREX extended abstract, Sep. 2008, 4 pages.

Serra, J., et al., "Chroma Binary Similarity and Local Alignment Applied to Cover Song Identification," IEEE Transaction on Audio, Speech, and Language Processing, Aug. 2008, pp. 1138-1151, vol. 16, Issue 6.

Serra, J., et al., "A Cover Song Identification System Based on Sequences of Tonal Descriptors," MIREX extended abstract, Austrian Computer Society, 2007, 2 pages.

"BMAT music innovation," Barcelona Music & Audio Technologies, 2005-2011, 5 pages, [online] [retrieved on Jul. 9, 2014] Retrieved from the internet <URL:http://www.bmat.com/company>.

"Sound Hound Instant Music Search and Discovery," Sound Hound Inc., 2011, 2 pages, [online] [retrieved on Jul. 9, 2014] Retrieved from the internet <URL:http://www.soundhound.com/.

"CBMS Networks, Inc.—Advanced DSP for Media Analysis, Indexing, and Search," Website for CBMS Networks, Inc., 2010, 1 page, [online] [retrieved on Jul. 9, 2014, http://web.archive.org/web/20110830183459/http://cbmsnetworks.com/] retrieved from the internet <URL:http://cbmsnetworks.com/>.

"BMAT—Barcelona Music & Audio Technologies," Website for BMAT, 2005-2011, 2 pages, [online] [retrieved on Jul. 9, 2014] retrieved from the internet <URL:http://www.bmat.com/>.

Notice of Allowance for U.S. Appl. No. 12/826,623, dated Dec. 29, 2011, 28 pages.

PCT International Search Report and Written Opinion, PCT/US2011/041681, Feb. 9, 2012, 6 pages.

Baluja, S., et al., "Waveprint: Efficient wavelet-based audio fingerprinting," Pattern recognition, 2008, pp. 3467-3480, vol. 41, No. 11.

Bertin-Mahieux, T., et al., "Large-scale cover song recognition using hashed chroma landmarks," In Proceedings of the International Symposium on Music Information Retrieval (ISMIR), Oct. 16-19, 2011, 4 pages.

Casey, M., et al., "Analysis of minimum distances in high-dimensional musical spaces," IEEE Transactions on Audio, Speech, and Language Processing, Jul. 2008, pp. 1015-1028, vol. 16, No. 5.

Ives, D., et al., "Pitch strength decreases as f0 and harmonic resolution increase in complex tones composed exclusively of high harmonics," The Journal of the Acoustical Society of America, May 2008, pp. 2670-2679, vol. 123, No. 5.

Marolt, M., "A mid-level representation for melody-based retrieval in audio collections," IEEE Transactions on Multimedia, Dec. 2008, pp. 1617-1625, vol. 10, No. 8.

Ravuri, S., et al., "Cover song detection: from high scores to general classification," IEEE International Conference on Acoustics Speech and Signal Processing (ICASSP), 2010, pp. 65-68.

Serra, J., "Identification of versions of the same musical composition by processing audio descriptions," PhD thesis, Universitat Pompeu Fabra, 2011, 185 pages.

Tsai, W., et al., "Using the similarity of main melodies to identify cover versions of popular songs for music document retrieval," Journal of Information Science and Engineering, 2008, pp. 1669-1687, vol. 24.

Wang, A., "An industrial strength audio search algorithm," In International Conference on Music Information Retrieval (ISMIR), Oct. 26-30, 2003, pp. 7-13, vol. 2.

Yang, C., "Music database retrieval based on spectral similarity,". In Proceedings of the International Symposium on Music Information Retrieval (ISMIR), 2001, 2 pages.

Office Action for U.S. Appl. No. 13/416,096, Oct. 4, 2012, 20 Pages.

Office Action for U.S. Appl. No. 13/615,061, Dec. 14, 2012, 17 pages.

Notice of Allowance for U.S. Appl. No. 13/416,096, dated Apr. 16, 2013, 19 pages.

Notice of Allowance for U.S. Appl. No. 13/615,061, dated Feb. 19, 2013, 19 pages.

Baluja, et al., "Content Fingerprinting Using Wavelets," 3rd European Conference on Visual Media Production, 2006, 10 pages.

Lyon, et al., "Sound Retrieval and Ranking Using Sparse Auditory Representations," Neural Computation, Sep. 2010, 31 pages, vol. 22, No. 9.

Dehak, N., et al., "Front-End Factor Analysis for Speaker Verification," IEEE Transactions on Audio, Speech and Language Processing, May 2011, 11 pages, vol. 19, No. 4.

Milano, Dominic, "Content Control: Digital Watermarking and Fingerprinting," White Paper, Rhozet, a business unit of Harmonic Inc., Last accessed Jul. 31, 2012, 11 pages.

Mohri, M., et al., "Speech Recognition with Weighted Finite-State Transducers," Springer Handbook on Speech Processing and Speech Communication, 2008, 31 pages.

Cano, P., et al., "A Review of Algorithms for Audio Fingerprinting," IEEE Workshop on Multimedia Signal Processing, Dec. 9-11, 2002, 5 pages.

Lu, J., "Video fingerprinting for copy identification: from research to industry applications," Proceedings of SPIE—Media Forensics and Security XI, Jan. 2009, 16 pages, vol. 7254.

Lu, J., "Video Fingerprinting and Applications: a review," Media Forensics & Security Conference, 2009, 31 pages, San Jose, CA.

Media Hedge, "Digital Fingerprinting," White Paper, Civolution and Gracenote, 2010, 12 pages.

Haitsma, J., et al., "A Highly Robust Audio Fingerprinting System," 2002, 9 pages.

Notice of Allowance for U.S. Appl. No. 13/404,978, dated Apr. 3, 2014, 20 pages.

Office Action for U.S. Appl. No. 13/732,030, dated Jan. 15, 2015, 17 pages.

Office Action for U.S. Appl. No. 13/405,023, dated Jan. 16, 2015, 43 pages.

* cited by examiner

REAL-TIME AUDIO RECOGNITION PROTOCOL

CROSS REFERENCES TO RELATED APPLICATIONS

This application is a continuation of U.S. patent application Ser. No. 13/404,978 filed Feb. 24, 2012 and entitled, "REAL-TIME AUDIO RECOGNITION PROTOCOL," which incorporated U.S. patent application Ser. No. 12/826,623, filed on Jun. 29, 2010, by reference in its entirety. The entireties of each are incorporated herein by reference.

TECHNICAL FIELD

The present disclosure generally relates to audio recognition, and specifically to providing a real-time audio recognition protocol.

BACKGROUND

In current audio recognition systems, audio samples are typically recorded live from an environment, and processed in order to extract useful information. For example, a fifteen second audio sample from a song can be captured using a microphone. The sample can subsequently be processed such that the song's title, artist, and album can be identified.

Current audio recognition systems are unable to perform recognitions for more than a single domain or content type. Illustratively, many audio recognition systems are only able to recognize that a captured audio sample is from a song. These same systems cannot, for instance, recognize that an audio sample is from a television show episode, is a sample of a speech, or is an environmental recording (e.g., bird song). As a result, users often must switch between different systems in order to properly identify their audio samples. Furthermore, current audio recognition systems provide results only after an audio sample has been completely captured. These systems are unable to provide results while an audio sample is still being recorded. As such, users frequently must wait relatively lengthy periods before receiving results.

SUMMARY

A computer-implemented method processes and recognizes an audio sample in real-time using multiple recognizers. In one implementation, a non-transitory computer-readable storage medium encodes instructions that, in response to execution by a computer system, configure the computer system to process and recognize an audio sample in real-time using multiple recognizers.

In one embodiment, two concurrent HTTP connections are established between a client and an audio recognition service. One connection is used by the client to transmit (e.g., stream) an audio sample to the audio recognition service for recognition. The other connection is used by the audio recognition service to return results for the audio sample to the client. By transferring data in this way, embodiments enable the return of recognition results for an audio sample to occur in parallel to the transmission of the sample to the audio recognition service.

The features and advantages described in this summary and the following detailed description are not all inclusive. Many additional features and advantages will be apparent to one of ordinary skill in the art in view of the drawings, specification and claims hereof.

The figures depict a preferred embodiment of the present disclosure for purposes of illustration only. One skilled in the art will readily recognize from the following discussion that alternative embodiments of the structures and methods illustrated herein may be employed without departing from the principles described herein.

DETAILED DESCRIPTION

System Architecture Overview

Figure 1:
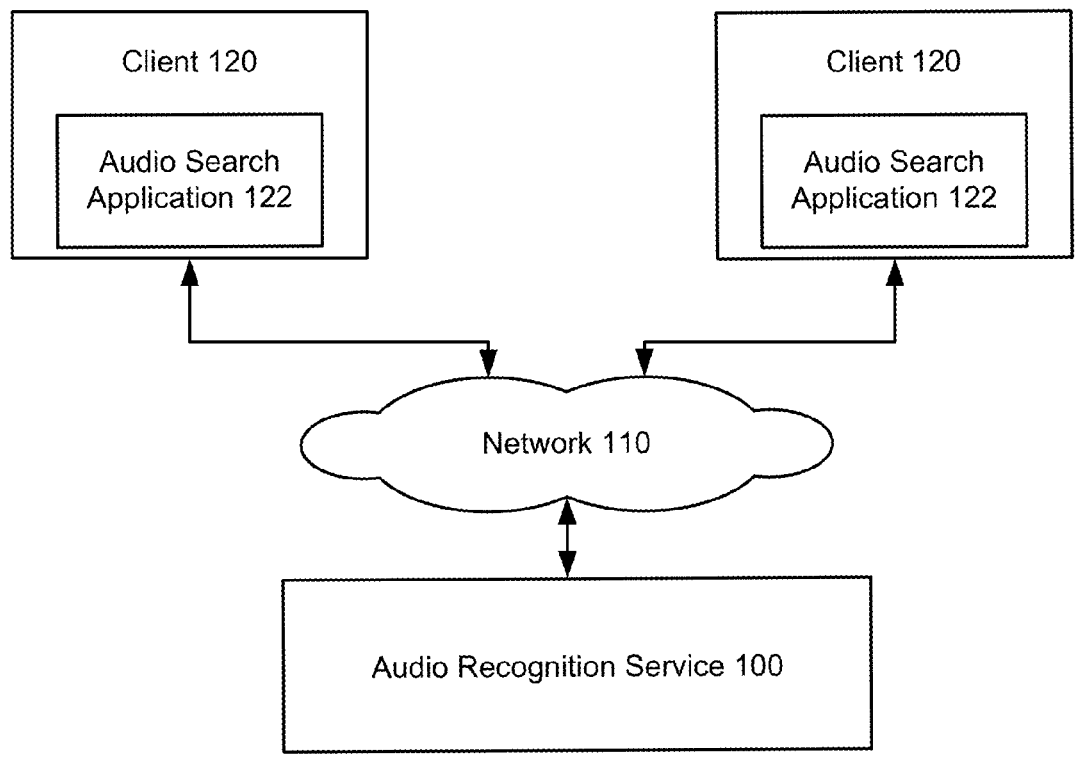
FIG. 1 is a block diagram of the system architecture in accordance with one embodiment.

FIG. 1 illustrates an exemplary computing environment that supports a system for performing real-time recognition of an audio sample using multiple recognizers in accordance with one embodiment. As shown in FIG. 1, the system includes an audio recognition service 100 that communicates with each client 120 over a network 110.

In general, the audio recognition service 100 includes one or more server programs executing on one or more server-class computers. Each service-class computer comprises a CPU, memory, network interface, peripheral interfaces, and other well known components. The computers themselves run a suitable operating system such as LINUX, UNIX, Microsoft Windows, or Mac OS X, have generally high performance CPUs, 2 GB or more of memory, and 1 TB or more of disk storage. Of course, other types of computers can be used, and it is expected that as more powerful computers are developed in the future, they can be configured in accordance with the teachings here. The functionality implemented by any of the elements can be provided from computer program products (e.g., as computer executable instructions) that are stored in tangible, non-transitory computer-readable storage mediums (e.g., RAM, hard disk, or optical/magnetic media).

Generally, the audio recognition service 100 processes audio samples received from the various clients 120 in order to identify results for the audio samples, and provide these results to the clients, and is one means for performing these functions. In one aspect, the audio recognition service 100 is configured to identify results across multiple content types (e.g., music types, television program types, etc). For example, the audio recognition service 100 can be configured to identify whether an audio sample is from a song, a television show episode, and/or a famous speech. Identified results can include any useful information regarding the audio sample.

In one aspect, the information included in the results can include several different information types. For example, a result can include identification information indicating that an audio sample is from a particular song, identifying the song by name, and, optionally, identifying the artist, recording, etc. The result can further include non-identification information for the song, such as reviews of the song or the artist, articles or web pages about the artist, tour dates for the artist, and other available information relevant to the song. The non-identification information can be retrieved from publically accessible sources, such as websites, blogs, magazines, online periodicals, etc. The result can further include social information for the song, such as information regarding other users who have listened to the song or like the song. The social information can be retrieved from social networking services and/or other social media. The result can moreover include purchase information for items related to the song, such as a digital copy of the song, merchandise related to the song or artist, etc. The purchase information can be retrieved from retailers, electronic marketplaces, advertisers, etc. All identified results can be provided back to the requesting client 120 for display in an integrated user interface via the audio search application 122.

The audio recognition service 100 is further configured to identify and return results for an audio sample prior to receiving the entirety of the audio sample from a client 120. For example, a client 120 can be configured to capture an audio sample fifteen seconds in length. While capturing the audio sample, the client 120 provides a series of one second portions ("window") of the audio sample to the service 100. The audio recognition service 100 can be configured to return results after only receiving or being sent two seconds of the sample, and while continuing to receive the portions for the remaining thirteen seconds. As additional portions of the audio sample are received, the audio recognition service 100 continues to identify and return additional results. As the results are received by the client 120, they are displayed in a manner that allows the user to identify them as additional results.

The audio recognition service 100 furthermore enables a user to check-in to a content item indicated by a result, and provide a reward in response to the check-in. As used herein, a check-in can be or include any indication of a user's interaction or interest in a physical or digital representation of an item accessible to the user. For example, a user can provide a check-in to a particular song, which indicates that the user is currently listening to the song. As another example, a user can check-in to a restaurant, which indicates that the user is currently having a meal at the restaurant. Responsive to a check-in, the audio recognition service 100 can cause a post to be published to a user's profile (e.g., a social network profile). The post can indicate, for example, that the user is currently listening to the content item (e.g., a song), likes the content item, has purchased or downloaded the content item, or the like. In addition, the service 100 can be configured to provide the user with some type of a reward, such as a discount on a digital copy of the content item.

The network 110 typically includes the Internet or a mobile network (e.g., a 3G network), but can be any network, including but not limited to any combination of a LAN, a MAN, a WAN, a mobile network, a wired or wireless network, a private network, or a virtual private network.

The clients 120 include any suitable computing device, such as a mobile phone, a tablet device, a personal computer, a laptop computer, a personal digital assistant, a television, a set top box, a video game console, and/or the like. The clients 120 to record audio samples from a physical environment, and accordingly include a microphone, analog to digital converter (ADC), and an audio codec (e.g., AAC, HE-AAC, MP3, FLAG, ALAC, Vorbis, WMA, and/or the like). While only two clients 120 are shown in FIG. 1, in practice, there may be many (e.g., millions) clients 120 that can communicate and interact with the audio recognition service 100 over network 110.

In one embodiment, each of the clients 120 executes an audio search application 122. The audio search application 122 is adapted to record an audio sample, process the audio sample (e.g., encoding a sample), send the audio sample to the audio recognition service 100 for identification, and receive the results from the audio recognition service 100, and is one means for performing these functions (either individually or jointly). The audio search application 122 is configured with a graphical user interface that enables a user to interact with the application 122. In particular, the audio search application 122 enables the user to initiate an audio recognition query via the user interface, and then present the received results to the user via the user interface. As noted above, the audio recognition service 100 is configured to provide results having various different content and information types. Accordingly the audio search application 122 can be configured to present such results having different types in a unified manner (i.e., results of different types combined in single list) or a segregated manner (i.e., results grouped by media or content type). For example, assume an audio sample transmitted to the audio recognition service 100 is identified by the service as being part of a song played on a particular television show, with a voice over by an actor on the television show. The audio recognition service 100 can return results to the audio search application 122 including a result identifying the song by name and artist (a music type), a result identifying the television show by name and network (a television program type), and a result identifying the actor by name (a speaker identification type). The results can be shown in a single list, or grouped by type.

The audio recognition service 100 can be configured to provide at least a partial set of the results to the audio search application 122 while the service 100 is still processing the audio recognition query. Further, results can be received by the search application 122 even as the search application 122 continues to record the audio sample and/or send portions of the audio sample to the audio recognition service 100. The audio search application 122 can display these additional results to the user as additional portions of the audio sample are transmitted to the audio recognition service 100 and results for those portions returned to the client 120. In other instances, results can be received while an audio recognition query is being performed, but not presented until the audio recognition query ends.

The audio search application 122 additionally enables the user, via the user interface, to view and check-in to content items indicated by any returned results, and is also a means for performing this further function. Through checking-in to a content item, a user can indicate that he or she is currently listening to, viewing, purchasing, and/or otherwise interacting with the content item. The audio search application 122 further enables the user, via the user interface, to view information regarding potential rewards associated with one or more of the returned results. The information can describe the potential rewards and the manner in which they can be earned. For example, the information can indicate that a free promotional item may be earned if a user checks-in to a particular television show three times. The audio search application 122 can further provide, via the user interface, information regarding a reward earned by a user. For example, the audio search application 122 can display a coupon code reward earned by the user.

Figure 2:
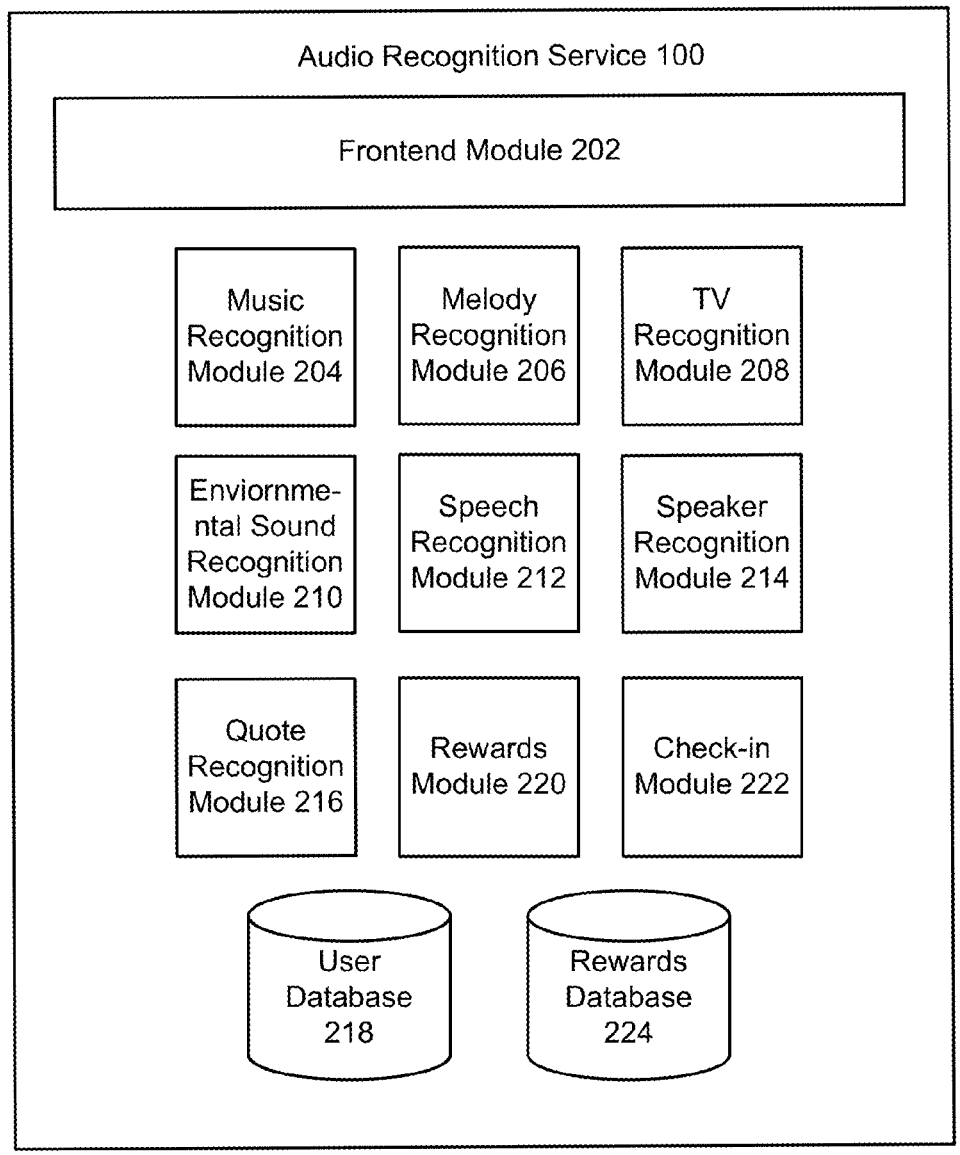
FIG. 2 is a block diagram of various components included in an audio recognition service in accordance with one embodiment.

FIG. 2 illustrates various components of the audio recognition service 100 in accordance with one embodiment. As shown in FIG. 2, the audio recognition service 100 includes a frontend module 202, a music recognition module 204, a melody recognition module 206, a TV recognition module 208, an environmental sound recognition module 210, a speech recognition module 212, a speaker recognition module 214, a quote recognition module 216, a user database 218, a rewards module 220, a check-in module 222, and a rewards database 224. The modules 204-216 are sometimes referred to generally as recognition modules.

In this description, the term "module" refers to computational logic for providing the specified functionality. A module can be implemented in hardware, firmware, and/or software. It will be understood that the named modules described herein represent one embodiment of the present invention, and other embodiments may include other modules. In addition, other embodiments may lack modules described herein and/or distribute the described functionality among the modules in a different manner. Additionally, the functionalities attributed to more than one module can be incorporated into a single module. Where the modules described herein are implemented as software, the module can be implemented as a standalone program, but can also be implemented through other means, for example as part of a larger program, as a plurality of separate programs, or as one or more statically or dynamically linked libraries. In any of these software implementations, the modules are stored on the computer readable persistent storage devices of the audio recognition service 100, loaded into memory, and executed by the one or more processors of the service's servers. It will also be appreciated that the operations of the audio recognition service 100 require computer implemented elements (e.g., memory, processor, etc.) and cannot be performed by the human mind as mere mental steps.

During an audio recognition query, the frontend module 202 receives an audio sample and optionally user information from the client 120. The audio sample can be encoded using the audio codec. The audio sample can additionally be encoded at any suitable bit rate and sampling frequency. For example, the audio sample can be encoded at 64 kbit/s and at an 11 kHz sampling frequency.

As an audio sample is transmitted from the client 120 to the frontend module 202, the frontend module 202 distributes the audio sample to the recognition modules 204-216 for identification. The frontend module 202 additionally receives any results returned from the recognition modules 204-216. In one implementation, the frontend module 202 can receive results prior to distributing an entire audio sample to the recognition modules 204-216. In such implementations, the results received from the recognition modules 204-216 are based on a portion of the entire audio sample. As additional portions of the audio sample are distributed to the recognition modules, the frontend module 202 can concurrently receive additional or updated results from the recognition modules 204-216. The frontend module 202 can combine, filter, or otherwise alter the results received from the recognition modules. The frontend module 202 can alter the results using any suitable preferences or criteria. For example, the frontend module 202 may be configured to filter out duplicate results. During an audio recognition query, the music recognition module 204 and the melody recognition module 206 may both determine that an audio sample is from a particular song. Rather than having two results indicating the same song, the frontend module 202 combines the results. The frontend module 202 can further delay from sending, to the client 120, any results returned from the recognition modules 204-216. For example, the frontend module 202 may be configured to send results every five seconds to a client. As such, during each five second period, the frontend module 202 can receive, but not send results. At the end of each five second period, the frontend module 202 can then send the results in a batch.

In one embodiment, the frontend module 202 sends received results to the rewards module 220, and in turn receives information regarding potential rewards associated with the results. The frontend module 202 thereafter sends the results and potential rewards information to the client 120, which in turn displays the results and information to the user. The frontend module 202 additionally receives check-in selections from the client 120, and forwards the check-in selections to the check-in module 222 for processing. A selection can indicate that the user wishes to check-in to a particular content item. The frontend module 202 furthermore forwards the check-in selections to the rewards module 220 and receives information regarding any rewards earned by a user. The rewards information is thereafter provided to the client 120.

The recognition modules 204-216, in general, perform the task of audio recognition. Typically, the recognition modules 204-216 each individually process an audio sample several times during an individual audio recognition query. In one implementation, the processing performed by each individual recognition module is based on the portion of the audio sample transmitted to the module up to that point. As an example, a recognition module may have received the first two seconds of an audio sample at a first point in a query. As such, the results identified by the recognition module would be based on the two second portion received up to the first point. At a second point in the query, the recognition module may have since received the following three seconds of the audio sample. As such, the results identified by the recognition module would be based on the five second portion received up to the second point.

In another implementation, each processing is based on the portion of the audio sample yet to be processed by the recognition module. For example, a recognition module may have received the first four seconds of an audio sample at a first point. As such, the results identified by the recognition module would be based on the four second portion received up to the first point. At a second point, the recognition module may have since received (but not processed) the next five seconds of the audio sample. In this implementation, the results identified by the recognition module at the second point would be based only on the five second portion of the audio sample yet to be processed.

In one implementation, an individual recognition module can be configured to send results to the frontend module 202 as the results are identified. Alternatively, a recognition module can be configured to send results to the frontend module 202 in periodic batches. It should be appreciated that each recognition module can be configured to send results in a different manner (e.g., as results are identified or in batch) and/or at different times from another recognition module.

The music recognition module 204 is configured to process an audio sample in order to determine whether the audio sample is associated with a particular item of music (e.g., a song), and is one means for performing this function. In particular, the music recognition module 204 can determine whether the audio sample is an exact or near match for at least a portion of an item of music. In one embodiment, the music recognition module 204 includes a database (not shown) of reference audio fingerprints. The reference audio fingerprints can be generated by the music recognition module 204 or obtained from another source. Each fingerprint in the database contains characteristic information about a music item, and can be used to identify the music item. Upon receiving an audio sample (either a portion of or in its entirety), the music recognition module 204 generates a fingerprint for the audio sample. After generating the fingerprint, the music recognition module 204 attempts to match the fingerprint for the audio sample with a fingerprint stored in the database of reference audio fingerprints. If a match is located, the music recognition module 204 provides a result to the frontend module 202. If a match is not located, the music recognition module 204 does not provide an indication to the frontend module 202.

When matching fingerprints, the music recognition module 204 is configured to tolerate an amount of noise in the fingerprint generated from the audio sample. For example, the audio sample may include distortions introduced by the microphone that recorded the sample and/or noise from the environment. As such, two fingerprints are considered a match if the two fingerprints are the same to within a degree of tolerance as determined by the music recognition module 204. The manner in which fingerprints are generated and matches determined can be based on any suitable technique, such as the techniques described in S. Baluja, M. Covell, "Content Fingerprinting Using Wavelets", *Visual Media Production*, 2006; Cano et al., "A Review of Algorithms for Audio Fingerprinting", 2002 *IEEE Workshop on Multimedia Signal Processing*, 2002; Haitsma and Kalker, "A Highly Robust Audio Fingerprinting System", *International Symposium on Music Information Retrieval*, 2002.

The melody recognition module 206 is configured to process a received audio sample in order to determine whether the audio sample is associated with a particular melody, and is one means for performing this function. In particular, the melody recognition module 206 can determine whether the melody of the audio sample matches a portion of a particular music item. For example, the melody recognition module 206 may determine that a melody hummed by a person in the audio sample is from the song "Jingle Bells". In one embodiment, the melody recognition module 206 includes a database (not shown) of reference intervalgram fingerprints created from a set of music items. The reference intervalgram fingerprints may be generated by the melody recognition module 206 or obtained from another source. Upon receiving an audio sample (either a portion of or in its entirety), the melody recognition module 206 generates an intervalgram fingerprint for the audio sample. The melody recognition module 206 then accesses the database of reference intervalgram fingerprints to locate a match for the intervalgram fingerprint of the audio sample. If a match is found, the melody recognition module 206 provides a result to the frontend module 202. If a match is not found, the melody recognition module 206 does not provide an indication to the frontend module 202. Further details regarding melody recognition based on intervalgram representations are set forth in U.S. application Ser. No. 12/826,623, which is incorporated by reference herein.

The TV recognition module 208 is configured to process a received audio sample in order to determine whether the audio sample is associated with a particular television show episode, and is one means for performing this function. In particular, the TV recognition module 208 can determine whether the audio sample exactly or very closely matches a portion of a television show episode's audio. In one embodiment, the TV recognition module 208 can match an audio sample using a technique similar to the technique described previously for the music recognition module 204. However, rather than using reference fingerprints derived from music items, the reference fingerprints are derived from the audio of a set of television show episodes.

The environmental sound recognition module 210 is configured to process a received audio sample in order to identify a source of the audio sample as being an environmental source, and is one means for performing this function. For example, the environmental sound recognition module can determine that the audio sample was generated by a particular animal (a bird, a lion, a whale), natural phenomena (e.g., rainstorm, lighting, waterfall), an urban sound source (e.g., an automobile horn, a bus, an airplane), or the like. In one embodiment, the environmental sound recognition module 210 includes a database (not shown) of reference audio representations created from a set of environmental sound samples. The reference audio representations may be generated by the environmental sound recognition module 210 or obtained from another source. Upon receiving an audio sample (either a portion of or in its entirety), the environmental sound recognition module 210 generates an audio representation for the audio sample. The environmental sound recognition module 210 then accesses the database of reference audio representations to locate a match for the audio representation of the audio sample. If a match is found, the environmental sound recognition module 210 provides a result to the frontend module 202. If a match is not found, the environmental sound recognition module 210 does not provide an indication to the frontend module 202. The manner in which audio representations are generated and matches determined can be based on any suitable technique, such as the technique described in R. Lyon, M. Rehn, S. Bengio, T. Walters, G. Chechik, "Sound Retrieval and Ranking Using Sparse Auditory Representations", Neural Computation, 2010.

The speech recognition module 212 is configured to process a received audio sample in order to determine whether the audio sample includes speech, and is one means for performing this function. The speech recognition module 212 thereafter transcribes any identified speech into text. Transcription of an audio sample can be performed using any suitable technique, such as the technique described in M. Mohri, Fernando Pereira, Michael Riley, "Speech Recognition with Weighted Finite-State Transducers", *Spring Handbook on Speech Processing and Speech Communication*, 2008.

The speaker recognition module 214 is configured to process a received audio sample in order to determine the identity of a speaker of the audio sample, and is one means for performing this function. For example, the speaker recognition module 214 can identify that a speaker is a particular individual, such as a well known individual (e.g., Julia Roberts). In one embodiment, the speaker recognition module 214 includes a database (not shown) of reference speaker representations created from a set of speech samples. The reference speaker representations may be generated by the speaker recognition module 214 or obtained from another source. Upon receiving an audio sample (either a portion of or in its entirety), the speaker recognition module 214 generates a speaker representation for the audio sample. The speaker recognition module 214 then accesses the database of reference speaker representations to locate a match for the speaker representation of the audio sample. If a match is found, the speaker recognition module 214 provides a result to the frontend module 214. If no match is found, the speaker recognition module 214 does not provide an indication to the frontend module 202. The manner in which speaker representations are generated and matches determined can be based on any suitable technique, such as the technique described in A. Dehak, P. Kenny, R. Dehak, P. Dumouchel, P.

Ouellet, "Front-End Factor Analysis for Speaker Verification", *IEEE Transactions on Audio, Speech and Language Processing*, 2011.

The quote recognition module 216 is configured to process a received audio sample in order to determine whether the audio sample is associated with a famous or well-known quote. For example, the quote recognition module 216 can determine that a quote was spoken by Martin Luther King, Jr. In one embodiment, the quote recognition module 216 can match the audio sample using a technique similar to the technique described previously for the music recognition module 204. However, rather than using reference fingerprints derived from music items, the reference fingerprints are derived from audio recordings of a set of quotes (e.g., a recording of Martin Luther King, Jr. reciting his "I Have a Dream" speech).

It should be appreciated that while the audio recognition service 100 is shown as including only the recognition modules 204-216, any suitable number of different recognition modules can be included. For example, the audio recognition service 100 can include a movie or film recognition module for identifying movies associated with an audio sample. As another example, the audio recognition service 100 can include an associated media recognition module for identifying media frequently associated with an audio sample (e.g., a video of a wedding can be identified based on an audio sample of Pachelbel's "Canon in D.").

The user database 218 stores information for registered users of the audio recognition system. The user database 218 stores login credentials for the users, such as usernames, passwords, and/or the like. The user database 218 additionally stores historical information for the users, such as the content items to which the users have previously checked-in. The user database 218 can additionally store information regarding the rewards previously earned by a user.

The rewards module 220 is configured to identify potential rewards and dispense any rewards earned by a user, and is one means for performing this function. In particular, the rewards module 220 receives information identifying the audio recognition results from the frontend module 202. Based on the identified results, the rewards module 220 identifies any potential rewards associated with any of the results through accessing the rewards database 224. The information regarding the potential rewards can be provided for display to a user in order to indicate the manner in which a specific reward can be earned. Each record in the rewards database 224 can reference a content item or set of related content items, a reward type, reward criteria, a reward expiration date or date range, and/or the like. The information populating the rewards database can be obtained from one or more sources, such as advertisers, retailers, and/or the like. Illustratively, a server of a retailer may periodically upload or otherwise electronically provide rewards information to the rewards module 220. Information regarding any identified potential rewards is sent to the frontend module 202 for further distribution to the audio search application 122. The rewards module 220 can additionally, responsive to a check-in, determine whether a user is currently eligible for a reward. For example, a user may become eligible for a reward after checking-in to a particular television show after a total of five times. The rewards module 220 can access historical information for the user stored in the user database 218. The historical information can indicate that the user has already checked-in to the television show series four times. Based on this information, the rewards module 220 can determine that the user currently needs to check-in one additional time before becoming eligible for the reward. The rewards module 220 can further generate or dispense a reward in any suitable manner. For example, the rewards module 220 can generate a coupon code usable by the user to purchase items from an electronic marketplace. As another example, the rewards module 220 can send a request to a social network indicating that a virtual badge be displayed on the user's social network profile.

The check-in module 222 is configured to process check-in selections, and is one means for performing this function. In one implementation, the check-in module 222 causes information regarding a received check-in selection to be published to one or more services. For example, the check-in module 222 can provide check-in information to a social network in order to have a post about the check-in selection published to a user's social network profile. The one or more services can be those services which the user has authorized that may receive his or her check-in information. The check-in module 222 can additionally update a user's information in user database 218. For example, the check-in module 222 can access user database 218 to update a user's current check-in count for a particular television show series.

The various entities shown in FIGS. 1 and 2 can communicate in any suitable manner. In one aspect, two concurrent HTTP connections are established between the client 120 and the frontend module 202 during an audio recognition query. The two connections are described herein as a lookup connection and a results connection. In one embodiment, the lookup connection facilitates the transmission of an audio sample from the client to the frontend module. The results connection, in turn, facilitates the transmission of results from the frontend module to the client.

To establish the connections, the client 120 sends a POST type request, which establishes the lookup connection, and a GET type request, which establishes the results connection. To associate the two connections, the client 120 includes identical session IDs in both the lookup and results requests. Because the requests each include the same session ID, the frontend module 202 is able to determine that the associated lookup and results connections correspond to one another for a particular client 120, thereby distinguishing between the various requests from any number of clients 120. In general, the session ID remains valid for the duration of the lookup connection.

As previously described, the lookup connection is used by the client 120 to transmit the audio samples to the frontend module 202. More specifically, during an audio recognition query, metadata for the audio sample as well as the audio sample itself is sent over the lookup connection. The information sent over the lookup connection can be encoded using a sequence of length prefixed protocol buffers (a form of TLV encoding). The lookup connection additionally facilitates the transmission of a final set of audio recognition results from the frontend module 202 to the client 120. A final set of audio recognition results can be returned to the client 120 after transmission of the audio sample has ended. By sending the final set of audio recognition results over the lookup connection, the frontend module 202 can indicate to the client 120 that the audio recognition query has ended.

The results connection, in general, facilitates the transmission of audio recognition results from the audio recognition service 100 to the client 120 while audio samples are still being transmitted over the lookup connection. Thus, the use of the two connections allows for a 'full duplex' type of connection between the client 120 and the service 100 using HTTP, which is conventionally used as a single, asynchronous, stateless connection. The results returned over the results connection can be based on the portion of the audio sample already transmitted to and processed by the audio recognition service 100, as described above. As also described above, the results connection is established by the client 120 through sending a results request. Following sending, the results request is held open until results are received, via the results connection, from the frontend module 202, or until the audio recognition query ends (e.g., as indicated by the return of the lookup request). In the event results are received, the client 120 sends another results request including the same session ID as used previously to the frontend module 202. In doing so, the results connection can be re-established. Subsequently identified results are thereafter received and processed over the results connection in a similar manner. Through establishing concurrent HTTP connections in the manner described herein, the audio recognition system enables results to be returned from the frontend module 202 while an audio sample is still being transmitted to the frontend module 202. In doing so, the audio recognition system is able to reduce both real and user-perceived latency.

In another embodiment, an audio sample and results for the audio sample are sent over a single HTTP connection. In the embodiment, the client 120 transmits the audio sample to the frontend module 202 over the lookup connection. After transmission of the audio sample ends, the client 120 receives results from the frontend module 202 over the lookup connection. In contrast to the dual HTTP connection method described previously, results are not received while the audio sample is being transmitted to the frontend module 202.

In one implementation, the audio recognition system is configured to support both the single HTTP connection method and the dual HTTP connection method described herein. In the implementation, the client 120, the frontend module 202, or some other entity determines prior to beginning an audio recognition query whether the query is to be carried out using a single HTTP connection or two concurrent HTTP connections. For example, the frontend module 202 may determine that a query is to be carried out using a single HTTP connection. In the example, the client 120 continues to establish two connections with the frontend module 202. However, over the course of the query, the frontend module 202 does not send results over the results connection. Rather, after the audio sample has been transmitted, the frontend module 202 provides all of the identified results to the client 120 over the lookup connection. As another example, the client 120 may determine that a query is to be carried out using a single HTTP connection. In the example, the client 120 establishes a single connection with the frontend module 202 over which the audio sample is transmitted and results returned.

Numerous variations from the system architecture of the illustrated audio recognition service 100 are possible. The components of the service 100 and their respective functionalities can be combined, redistributed, or modified. For example, the functionalities ascribed herein to any of the recognition modules can be implemented using a single computing device or using any number of distributed computing devices communicatively coupled via a network. For instance, the music recognition module 204 and the melody recognition module 206 could be readily combined into a single module. As another example, the dual HTTP connection method described previously could be implemented by issuing a results request first receiving a server-generated session ID, which can be used as a token to perform a lookup request. As still another example, the dual HTTP connection method described previously could utilize a chunked HTTP response in order to retrieve results.

Real-Time Audio Recognition

Figure 3:
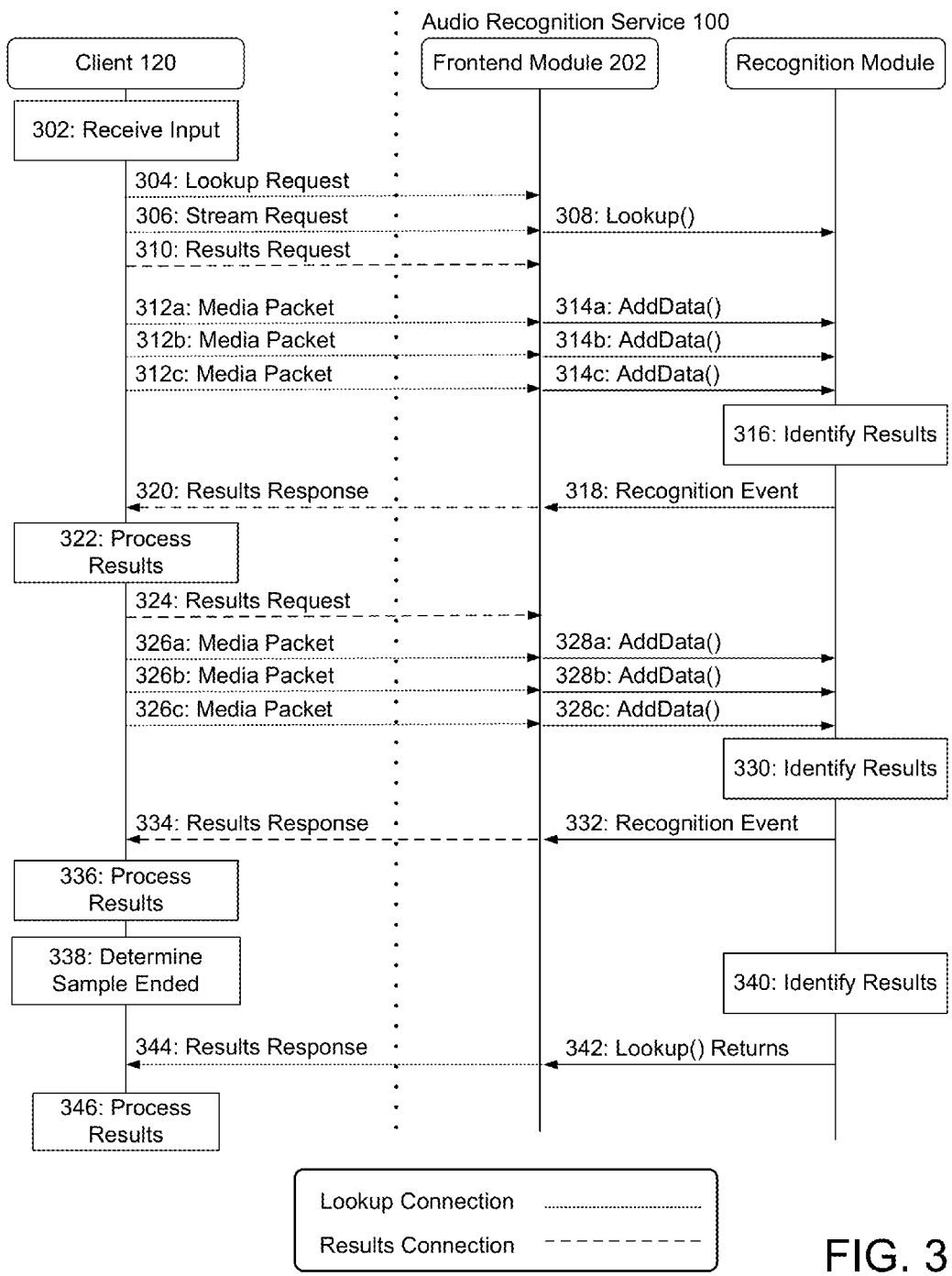
FIG. 3 illustrates an interaction diagram showing a method for processing an audio sample using two concurrent connections in accordance with one embodiment.

FIG. 3 illustrates an interaction diagram showing a method for processing an audio sample using two concurrent connections in accordance with one embodiment. Other embodiments can perform one or more steps of FIG. 3 in a different sequence. Moreover, other embodiments can include additional and/or different steps than the ones described herein.

As shown in FIG. 3, the client 120 communicates with the frontend module 202 via two concurrent HTTP connections (the lookup and results connection). The frontend module 202, in turn, makes remote procedure calls (RPCs) to a recognition module in order to process a transmitted audio sample. For purposes of simplicity, FIG. 3 shows the frontend module 202 as communicating with a single recognition module, but it should be understood that the frontend module 202 communicates with several different recognition modules during an audio recognition query. By communicating with several different recognition modules, results can be concurrently identified across several content types.

In FIG. 3, the client 120 begins by receiving 302 an indication from a user to initiate an audio recognition query. For example, the user may select a "click to listen" button presented on a user interface of the client 120 to provide such an indication. Upon receiving the indication, the client 120 establishes a lookup connection with the frontend module 202 by sending 304 a POST request to the frontend module. The lookup request includes identification information (e.g., a client identifier, a username, a password, etc.), client version information (e.g., an operating system version, a device model version, etc.), a session ID for the lookup connection, etc. After sending the lookup request, the client 120 sends 306 a transmission request to the frontend module 202 via the lookup connection. The transmission request includes header information for the audio sample to be transmitted as well as the audio sample's type (e.g., the format in which the audio sample is encoded). For example, the transmission request can include information indicating that the audio sample was encoded using the Vorbis codec.

After receiving the transmission request from the client 120, the frontend module 202 sends 308 a lookup( ) call to the selected recognition module. The lookup( ) call can be a remote procedure call. The selected recognition module can be one of several selected recognition modules to which the lookup( ) call is sent. For example, the frontend module 202 can send the lookup( ) call to the music recognition module 204, the melody recognition module 206, the television recognition module 208, the environmental sound recognition module 210, the speech recognition module 212, the speaker recognition module 214, and the quote recognition module 216. Through invoking the lookup( ) call, the frontend module 202 indicates to each recognition module that an audio sample is to be processed for recognition. The set of recognition modules can be selected in any suitable manner. For example, the frontend module 202 may receive a communication from the client 120 indicating that only music and television shows be identified. As such, the frontend module 202 may send lookup( ) calls only to the music recognition module 204, the melody recognition module 206, and the television recognition module 208. As another example, the frontend module 202 may again receive a communication from the client 120 indicating that only music and television shows be identified. The frontend module 202 may send lookup( ) calls to each of the backend modules along with indications that only music and television show results be returned. Each backend module can thereafter determine whether it is capable of returning music or television show results. Those backend modules capable of doing so can proceed with processing a received audio sample.

In addition to establishing the lookup connection, the client 120 establishes the results connection by sending 310 a results request to the frontend module 202. The results request includes, among other information, the same session ID used for the lookup connection. Following establishment of the lookup and results connections, the client 120 transmits 312 media packets to the frontend module 202. As shown in FIG. 3, the media packets are sent via the lookup connection. Each media packet can include a segment of the audio sample to be identified. For example, each media packet can include 0.5 second segments of the audio sample. Media packets can be sent to the frontend module 202 as the client 120 records and encodes the audio sample. Upon receiving each media packet, the frontend module 202 forwards 314 the audio sample segments to the selected recognition module for processing. In particular, the received audio sample segments are forwarded by the frontend module 202 through invoking AddData( ) calls in the recognition module. The AddData( ) calls can be remote procedure calls.

The recognition module then identifies 316 a set of results based on the received audio sample segments. Each result can include information regarding, for example, the identity of the audio sample. For example, assume the recognition module is the television recognition module 208. In that case, the audio sample may be identified as being from a particular television show episode. A corresponding result may include the series name, episode title, and production number for the television show episode. As another example, an audio sample may be identified as being generated by a particular species of bird. A corresponding result may include the bird's common name, scientific name, and/or the like. After identifying any results, the recognition module sends 318 a recognition event to the frontend module 202. The recognition event can include the results identified by the recognition module. It should be appreciated that the recognition event need not be sent by the selected recognition module at the same time other recognition events are sent by other recognition modules. Rather, each recognition module can send a recognition event at different times during a query.

Upon receiving a recognition event, the frontend module 202 sends 320 a results response to the client 120 via the results connection. The results response includes the results received from the selected recognition module. In one implementation, the frontend module 202 sends a results response to the client 120 as results are received from each selected recognition module. In another implementation, the frontend module 202 batches the results received from the selected recognition modules prior to sending the results to the client 120. In such an implementation, the frontend module 202 waits a predefined interval in which results can be received from any selected recognition modules. All results received during the interval period are batched and sent to the client 120. Results received subsequent to the interval can be sent in later batches to the client 120.

After receiving the results response, the client 120 processes 322 the results included in the response. As part of the processing, the client 120 displays the results to its user via a user interface. The displayed results can include results having multiple content types. For example, a first result can reference a television show episode. A second result can reference a song. Following processing, the client 120 sends 324 another results request to the frontend module 202.

The client 120 further transmits 326 additional media packets to the frontend module 202 via the lookup connection. Each additional media packet can include an additional segment of the audio sample to be processed for identification. The additional audio segments can sequentially follow the audio segments previously sent to the frontend module 202 in the audio sample. Upon receiving the additional media packets, the frontend module 202 forwards 328 the audio sample segments of the media packets to the selected recognition module for processing. In particular, the received audio sample segments are forwarded by the frontend module 202 through invoking AddData( ) calls in the selected recognition module.

Subsequent to receiving the audio sample segments, the selected recognition module identifies 330 a set of additional results. The additional results can be based at least in part on the additional audio sample segments. After identifying any additional results, the recognition module sends 332 a recognition event to the frontend module 202. Responsive to receiving the recognition event, the frontend module 202 sends 334 a results response to the client 120 via the results connection. The results response includes the additional results. The client 120 subsequently processes 336 the results and presents the results to its user. The additional results can presented along with the previously received results.

In the example shown in FIG. 3, the client 120 determines 338 that transmitting of the audio sample is to be terminated. The client 120 can make such a determination in any suitable manner. For example, the client 120 may be configured to limit the duration of the audio sample to fifteen seconds. Thus, after transmitting an audio sample for that duration, the client 120 ceases transmitting to the frontend module 202. As another example, the client 120 may receive an indication from the user to end transmitting.

In one implementation, the client 120 automatically sends a message or some other indicator to the frontend module 202 indicating that transmission of the audio sample has ended. In another implementation, the client 120 does not provide a specific indication to the frontend module 202. Rather, the frontend module 202 determines that transmitting has ended after waiting a timeout period during which no additional media packets are received.

Following termination, the recognition module 340 identifies any remaining results. Thereafter, the lookup( ) call 342 returns with any remaining results. The remaining results are forwarded 344 to the client 120, which processes the results. As shown in FIG. 3, the remaining results are sent via a results response over the lookup connection. Once the remaining results are received, the client 120 processes 346 the results. In particular, the client 120 displays a final set of results including the remaining results to the user via the user interface.

Real-Time Audio Recognition Interface

Figure 4A:
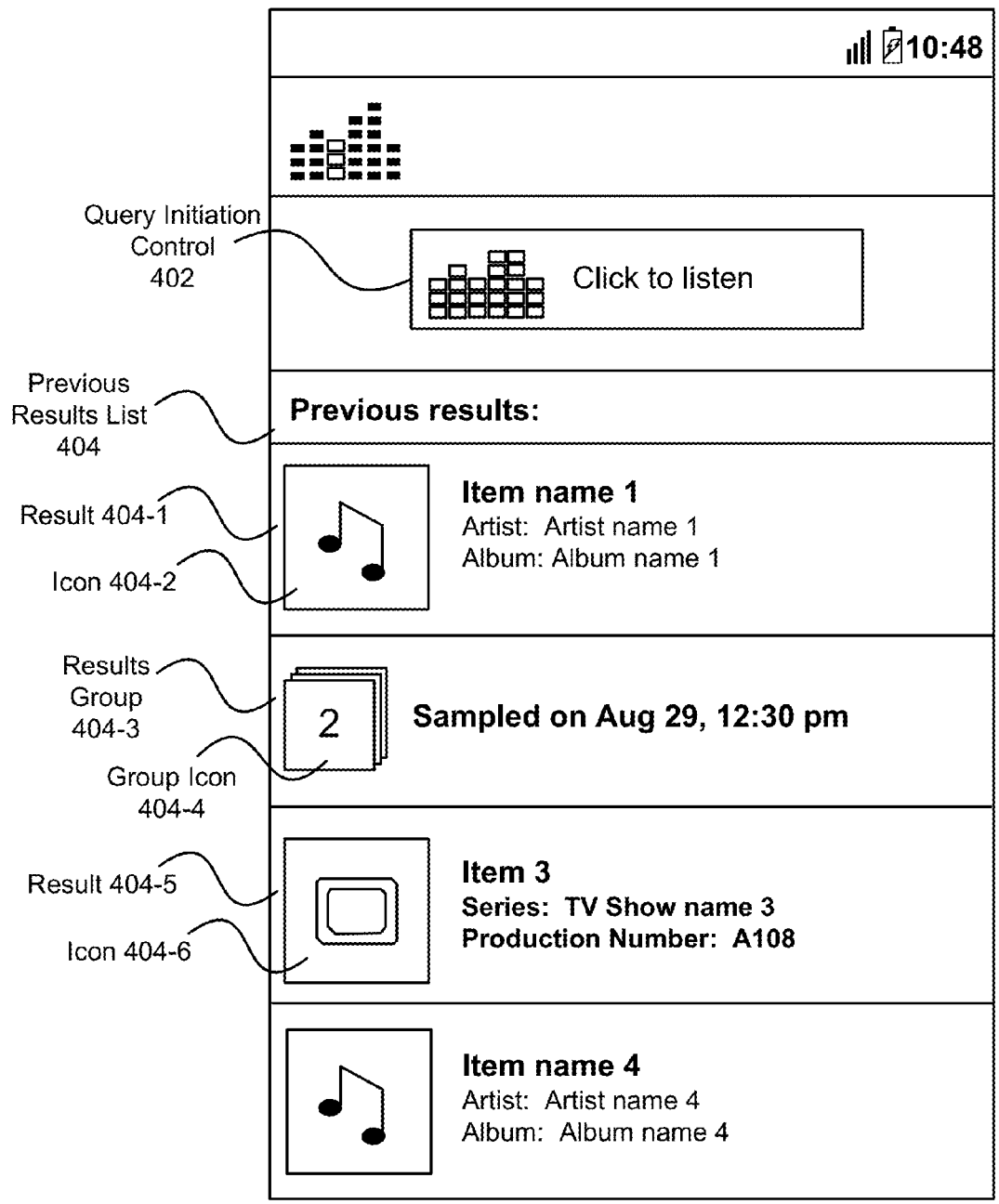
FIGS. 4A-4F illustrate a user interface for supporting audio recognition in accordance with one embodiment.
Figure 4B:
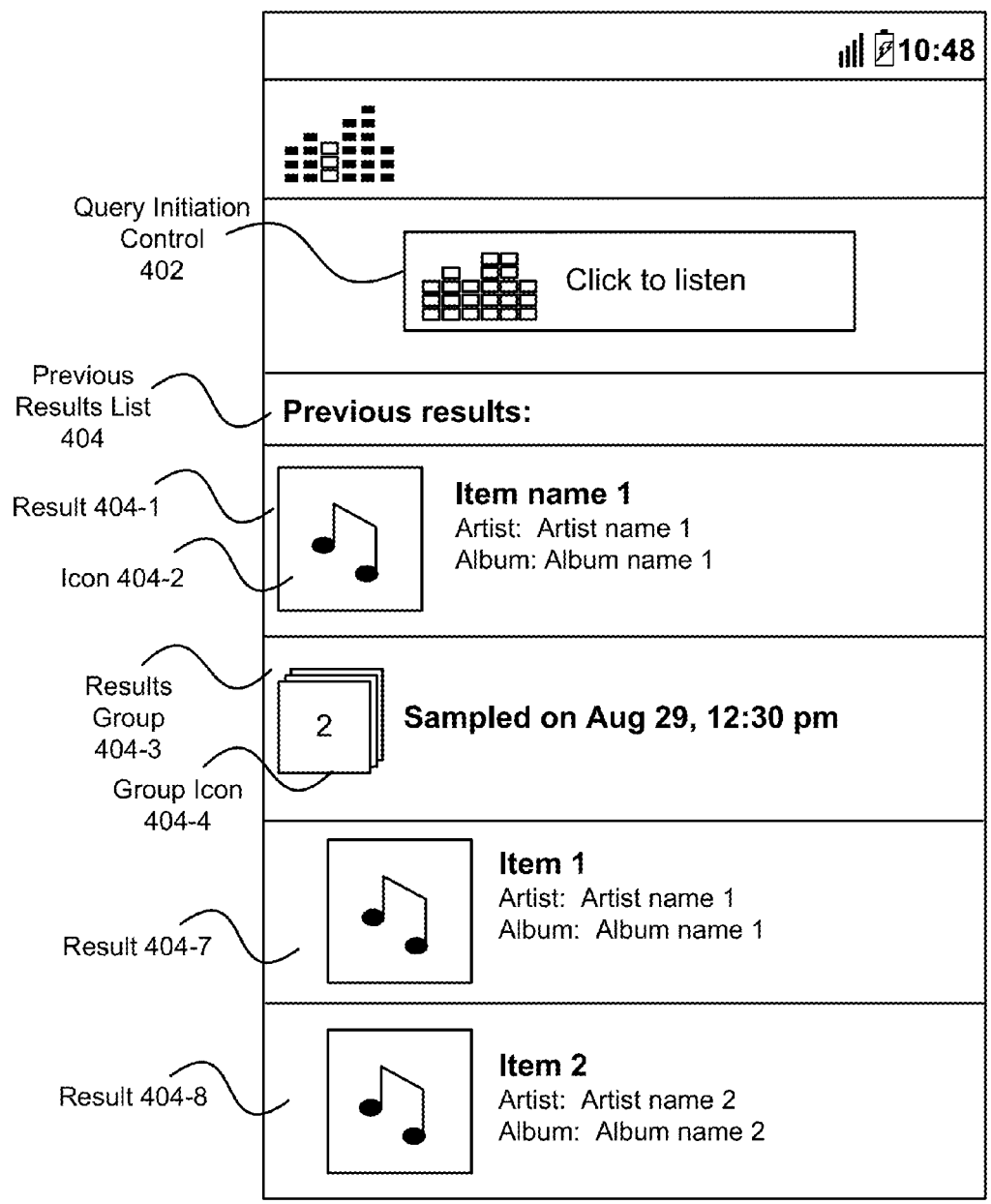

FIGS. 4A-4F illustrate a user interface 400 for supporting audio recognition in accordance with one embodiment. The user interface 400 can be displayed by the audio search application 122. FIGS. 4A and 4B illustrate the user interface 400 prior to initiation of an audio recognition query. As shown in FIG. 4A, the user interface 400 includes a query initiation control 402 and a previous results list 404. The query initiation control 402 enables a user to start an audio recognition query. In particular, by selecting the query initiation control 402, the user can cause the client 120 to begin the live recording of an audio sample. As the audio sample is recorded, the client 120 transmits the audio sample to the audio recognition service 100.

The previous results list 404 includes results returned during previously performed audio recognition queries. The results populating the previous results list 404 can have different content types. For example, in FIG. 4A, the previous results list 404 includes the result 404-1, which is associated with a music type, and the result 404-5, which is associated with a television program type. Each result's content type can be indicated by a visual indicator. Illustratively, the music type for the result 404-1 is indicated by an icon 404-2 portraying a musical note. The television program type for the result 404-5 is indicated by an icon 404-6 portraying a television set.

As further shown in FIG. 4A, each result includes information specific to its content type. For example, the result 404-1 includes artist and album information. In contrast, the result 404-5 includes series name and production number information. A user can select a result from the previous results list 404 to obtain additional information about the result. For instance, by selecting the result 405-5, the user may be presented with a synopsis of the television show indicated by the result. In one embodiment, the information presented can include offers to purchase items. For example, by selecting a result referencing a television show episode, the user may be presented, via the user interface, with an offer to purchase a digital copy of the episode from an electronic marketplace.

Figure 4C:
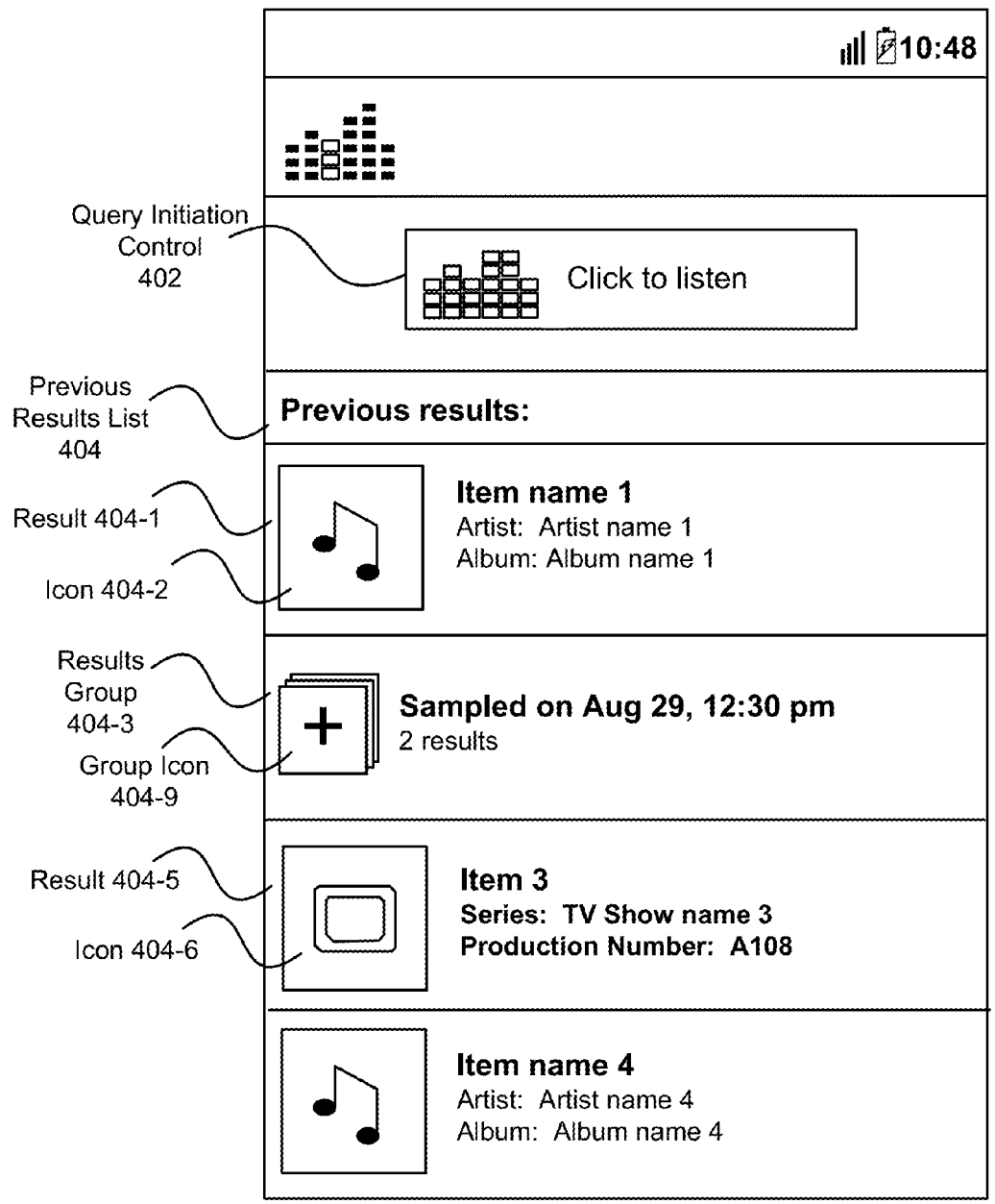
Figure 4D:
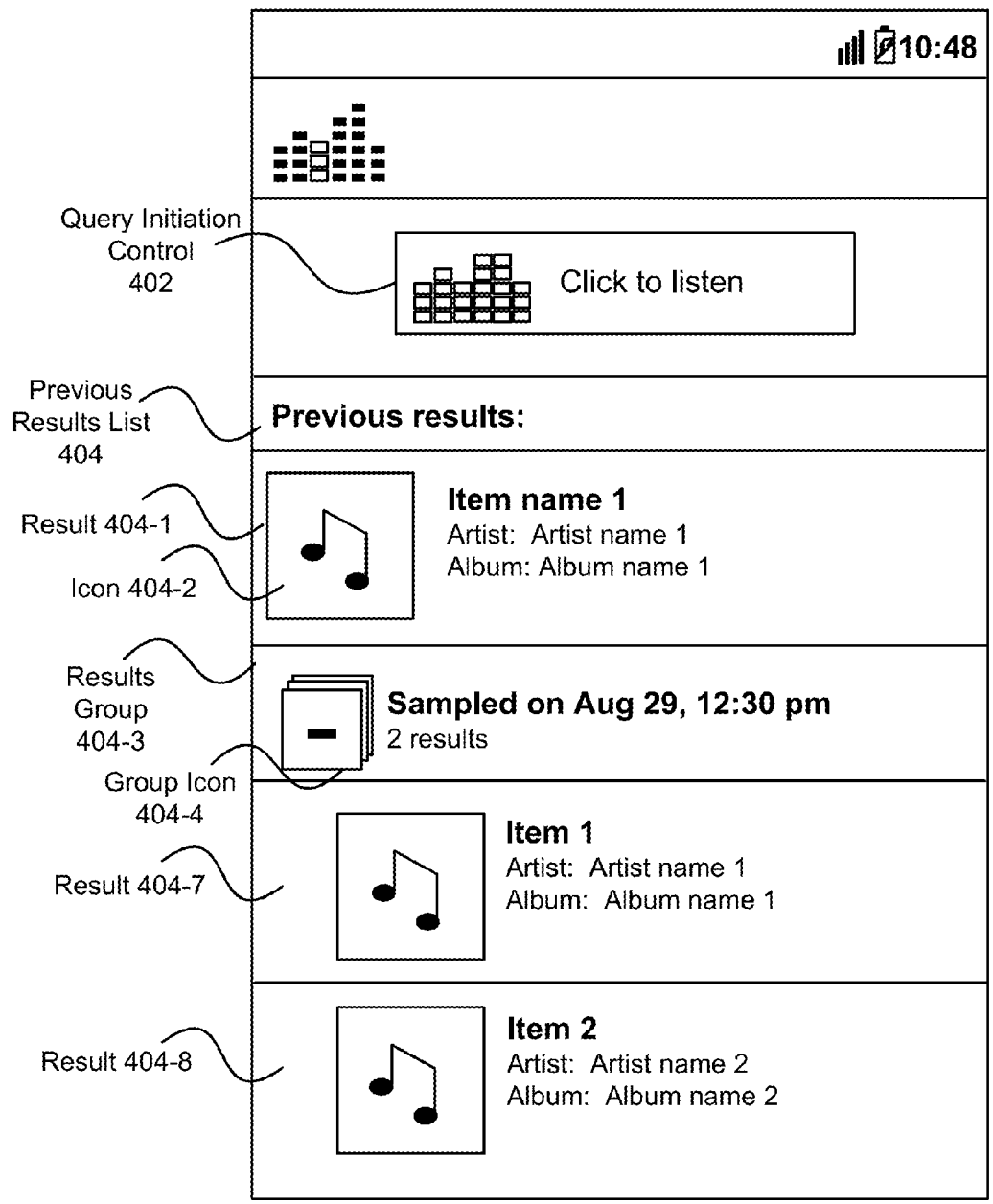

Results from the same audio recognition query can be grouped together. For example, as shown in FIG. 4A, results group 404-3 indicates that two results were returned during an audio recognition query performed on August 29 at 12:30 pm. In particular, the group icon 404-4 indicates a "2", which is the number of results in the group. In FIG. 4B, the results group 404-3 has been selected (e.g., through clicking on the icon 404-4). As a result of the selection, the results 404-7 and 404-8 (which are part of the results group 404-3) can appear in the previous results list 404. By grouping results in this manner, the user interface 400 enables users to more easily browse the previous results list 404. FIGS. 4C and 4D are similar to FIGS. 4A and 4B. However, in FIGS. 4C and 4D, the results group 404-4 includes a group icon 404-9 that portrays either a plus or a minus sign. In particular, when the results associated with the results group 404-4 are hidden, the group icon 404-9 portrays a plus sign. When the results associated with the group 404-4 are visible, the group icon 404-9 can portray a minus sign.

Figure 4E:
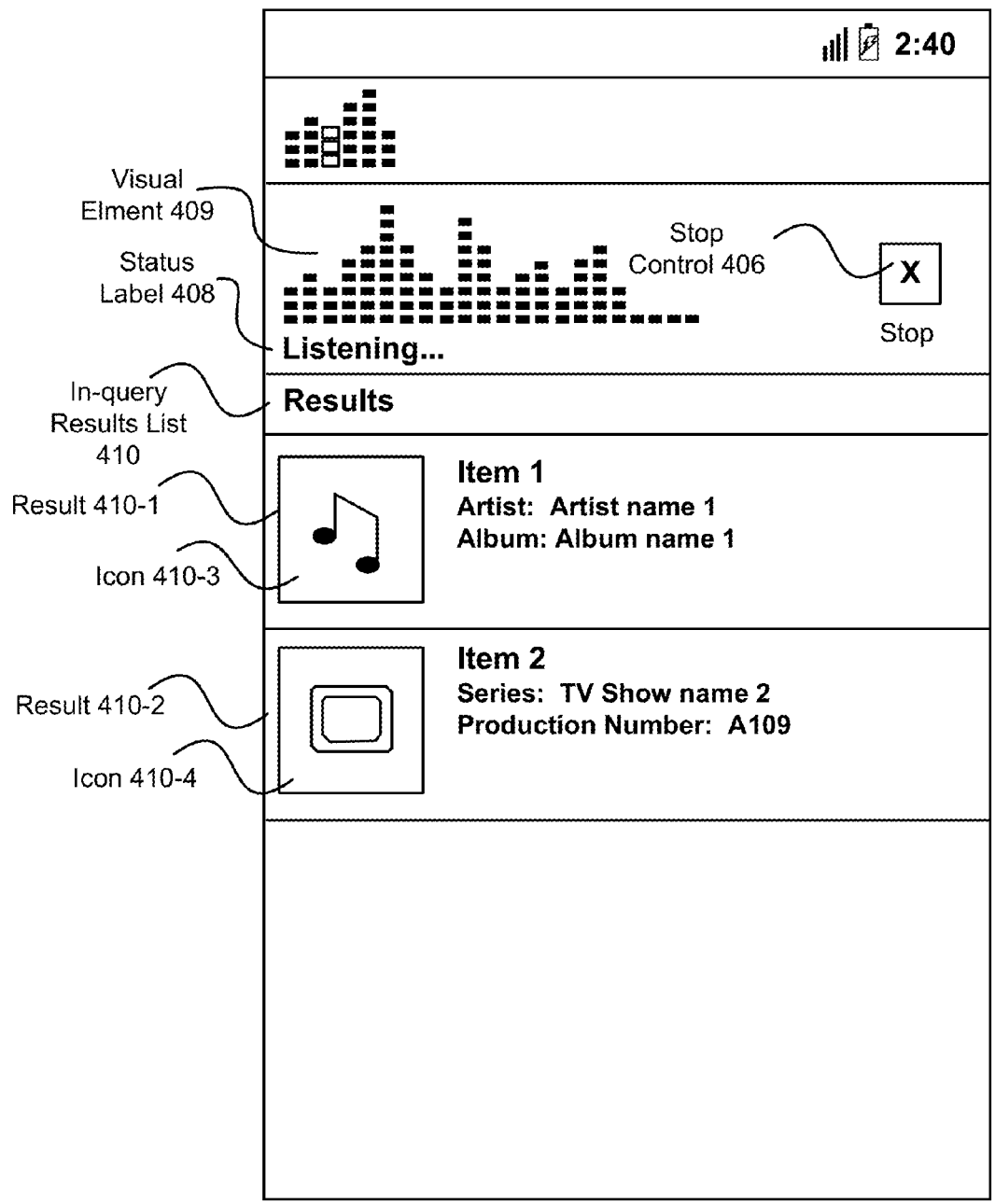
Figure 4F:
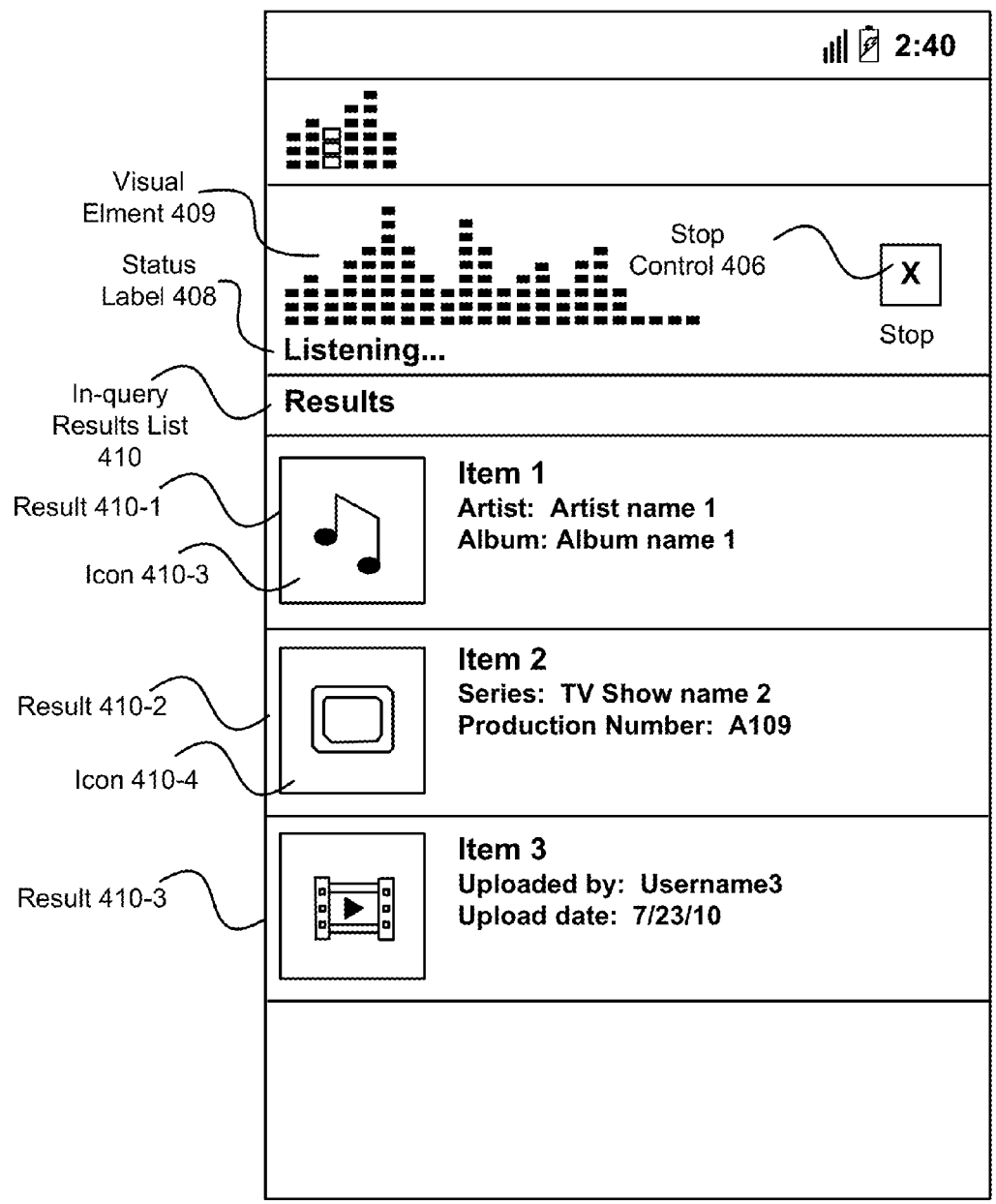

FIGS. 4E and 4F illustrate the user interface 400 during an audio recognition query. In particular, FIG. 4E illustrates the user interface 400 at a first point in the query. FIG. 4F illustrates the user interface 400 at a later point in the query. As shown in both FIGS. 4E and 4F, the user interface 400 includes a stop control 406, a status label 408, a visual element 409, and an in-query results list 410.

The stop control 406 enables a user to terminate an audio recognition query. In particular, if a user selection of the stop control 406 is received, processing of the audio sample ends (e.g., recording and/or transmitting of the audio sample ceases). The status label 408 and the visual element 409 provide information regarding the status of an audio recognition query. More specifically, the status label 408 provides a text-based indication of a query's status. For example, in FIG. 4E, the status label 408 indicates that the client 120 is "listening," which indicates that an audio sample is currently being recorded and/or transmitted to the audio recognition service 100. The visual element 409 provides a visual indication of a query's status. In particular, while an audio sample is being recorded and/or transmitted, the visual element 409 visually represents the sound of the audio sample. For example, the visual element 409 displays an animation based on the frequency spectrum or loudness of the audio sample.

The in-query results list 410 enables a user to view results that are returned from the audio recognition service 100 during an audio recognition query. In one embodiment, the in-query results list 410 is populated with results in real-time or in near real-time. More specifically, the in-query results list 410 can be populated with results received from the service 100 at the same time that the audio sample is still being recorded and/or transmitted to the service 100. Furthermore, the in-query results list 410 can be updated as additional results are returned. For example, in FIG. 4E, the in-query results list 410 includes two results: 410-1 and 410-2. In FIG. 4F, which illustrates the user interface 400 at a later time (e.g., a few moments later), the in-query results list 410 includes three results: 410-1, 410-2, and 410-3.

The in-query results list 410 can include results with different content and information types, corresponding to the various different recognition modules. For example, as shown in FIG. 4E, the in-query results list 410 includes the result 410-1, which is associated with a music type, and the result 410-2, which is associated with a television program type. A result's content type can be indicated in any suitable manner. For example, in FIG. 4E, each result's content type is indicated by an icon (e.g., the icons 410-3 and 410-4).

The in-query results list 410 can further be organized based on content type. For example, results having the same content type can be grouped together. Different content and information types can additionally have their own views in the user interface 400. For instance, the in-query results list 410 may include a separate result section for each content type, such as a different tab in the user interface 400. As another example, the in-query results list 410 may include a separate information section for each information type included within a result. For example, the user interface 400 may comprise a first tab including identification information for a result such as a song, a second tab including reviews for the song, and a third tab including comments about the song retrieved from a social networking service.

The results in the in-query results list 410 can additionally be ordered and prioritized. For example, the results can be ordered based on content type, time or quality. The manner in which the results are prioritized can be based on, for example, preferences input by the user. Illustratively, a user may have previously indicated that he or she is primarily interested in results associated with music. As such, results having a music type may be shown ahead of other results. For example, results associated with the music type may be listed higher on the in-query results list 410.

Each result can include information specific to its content type. For example, the result 410-1 includes artist and album information. In contrast, the result 410-2 includes series name and production number information. A user can select a result from the in-query results list 410 in order to obtain additional information about the result. For example, by selecting a result referencing a particular song, the user can obtain information regarding the song's title, artist, album, etc. In one embodiment, the information presented can include offers to purchase items. For example, by selecting a result referencing a movie, the user may be presented with an offer to purchase a digital copy of the movie from an online retailer.

Incentive Based Check-in

Figure 5:
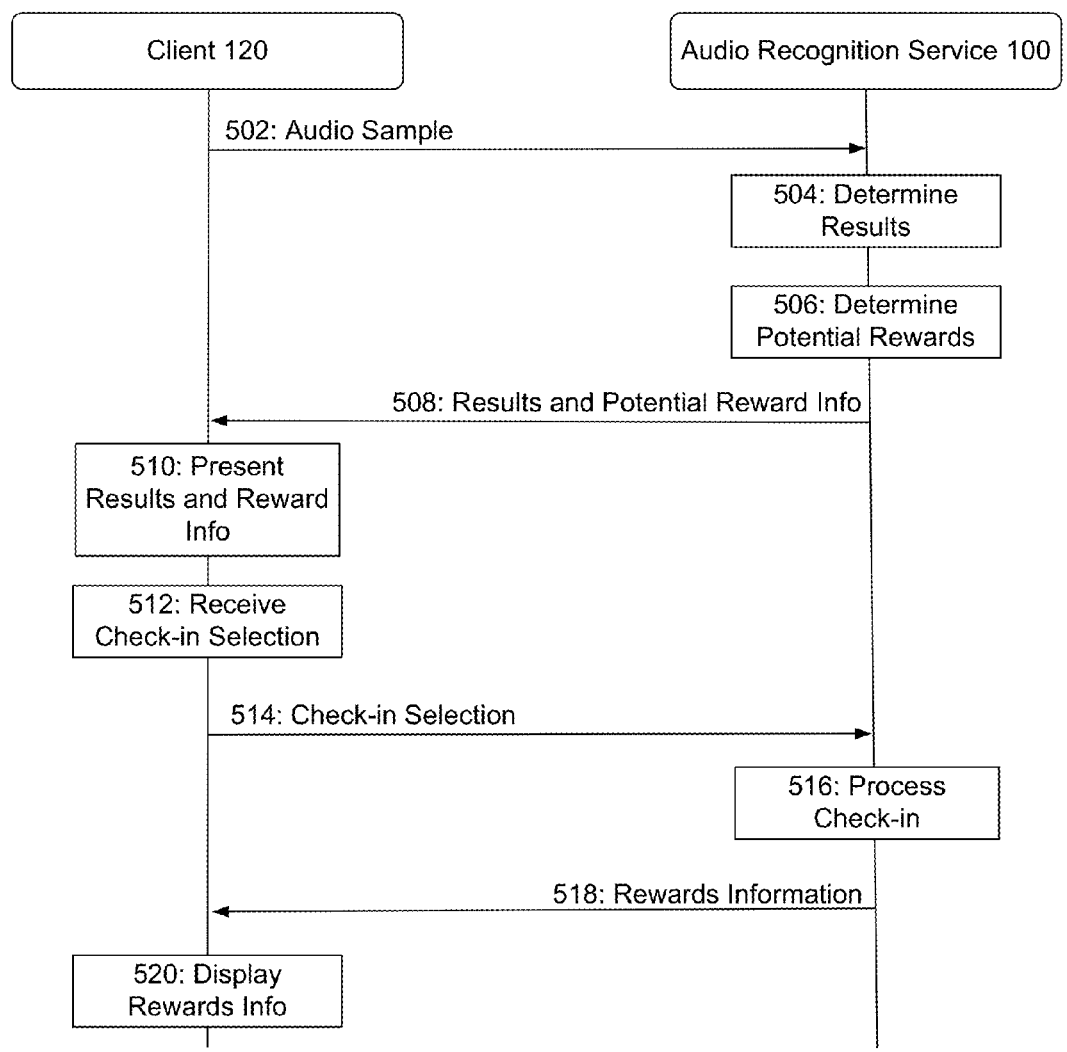
FIG. 5 illustrates an interaction diagram showing a method for providing rewards based on a check-in in accordance with one embodiment.

FIG. 5 illustrates an interaction diagram showing a method for providing a reward based on a check-in in accordance with one embodiment. Other embodiments can perform one or more steps of FIG. 5 in a different sequence. Moreover, other embodiments can include additional and/or different steps than the ones described herein.

As shown in FIG. 5, the client 120 transmits 502 an audio sample to be identified. In response to receiving at least a portion of the audio sample, the audio recognition service 100 determines 504 a set of results that matches the audio sample. Based on these results, the rewards module 220 of the audio recognition service 100 determines 506 a set of potential rewards (e.g., discounts, promotional packages, coupon codes, virtual items, virtual badges, virtual symbols, achievement levels, etc). More specifically, the rewards module 220 can access the rewards database 224 in response to receiving results. The rewards module 220 can thereafter perform a lookup of each content item identified in the results to determine whether there are any rewards associated with the content item.

The results and potential rewards information are sent 508 to the client 120. Thereafter, the client 120 presents 510 the results and potential rewards information to the user via a user interface. The results and potential rewards information can be subsequently updated as additional results and potential rewards information are received by the client 120. The updates can be a result of the audio recognition service 100 receiving and processing additional portions of the audio sample.

After presenting the results and potential rewards information to the user, the client 120 receives 512 a check-in selection from the user. The check-in selection indicates that the user wishes to check-in to a content item indicated by a result. The client 120 forwards 514 the check-in selection to the audio recognition service 100. Upon receiving the check-in selection, the audio recognition service 100 processes 516 the check-in. In particular, the check-in module 222 may notify a social network or other service that the user is currently listening to, viewing, likes, or otherwise interacting with the content item associated with the check-in. The service can, in turn, publish such information to the user's profile. The services that the audio recognition service 100 notifies can be those services that the user has previously authorized the audio recognition service 100 to contact.

The rewards module 220 can additionally determine whether the user is eligible for a reward based on the check-in selection. In particular, the rewards module 220 can access the user database 218 to determine a user's current number of check-ins for the content item referenced by the check-in selection or for a set of related content items that includes the referenced content item. The rewards module 220 can additionally access the rewards database to determine whether the user is eligible for a reward. In particular, the reward criteria and expiration for a reward from the rewards database are checked against the number of user check-ins for the content item or set of content items. If all conditions are met, (e.g., the user's total number of check-ins meets a threshold indicated by the reward criteria) the audio recognition service 100 provides the reward to the user. For example, the audio recognition service 100 can generate a coupon code usable at an electronic marketplace. As another example, the audio recognition service 100 may notify a social network or other service that the user has earned for a virtual badge.

Upon processing the check-in, the audio recognition service 100 sends 518 information about the reward to the client 120. The information can, for example, indicate that the user has earned a virtual badge for his or her social network user profile. After receiving the information, the client 120 displays 520 the information via the user interface to the user.

Interface for Check-In Selection and Reward Procurement

Figure 6A:
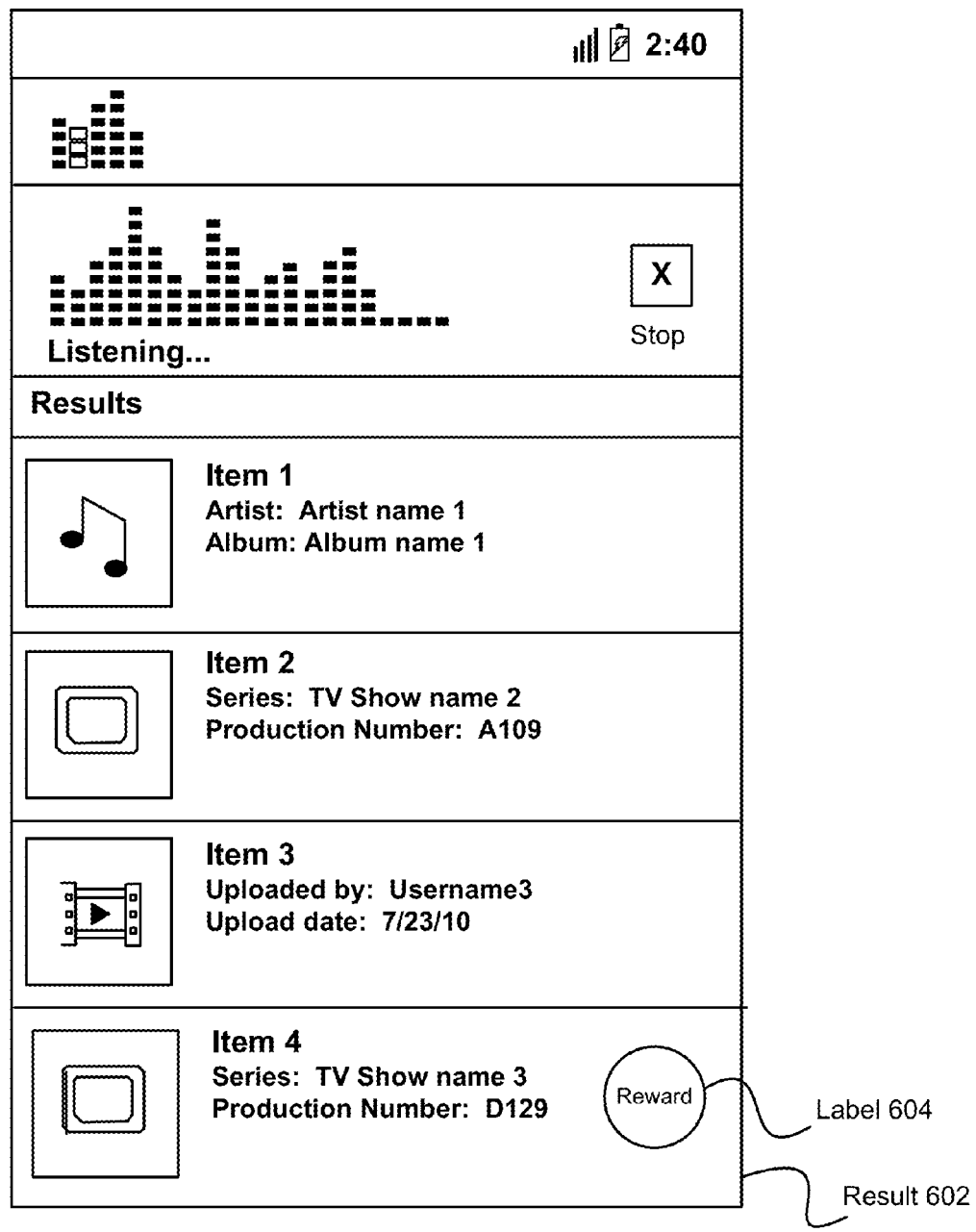
FIGS. 6A-6D illustrate a user interface for supporting check-in selection and reward procurement in accordance with one embodiment.

FIGS. 6A-6D illustrate a user interface 600 for supporting check-in selection and reward procurement in accordance with one embodiment. The user interface 600 can be displayed by the audio search application 122. FIG. 6A illustrates the user interface 600 during an audio recognition query. As shown in FIG. 6A, the user interface 600 presents a number of results, including the result 602. The result 602 includes label 604, which provides an indication that a reward can be earned in response to checking-in to the content item referenced by the result. The label 604 can provide such an indication in any suitable manner. As shown, in FIG. 6A, the label 604 can be text based. The label 604 can additionally or alternatively include a visual element, such as an icon or virtual symbol.

Figure 6B:
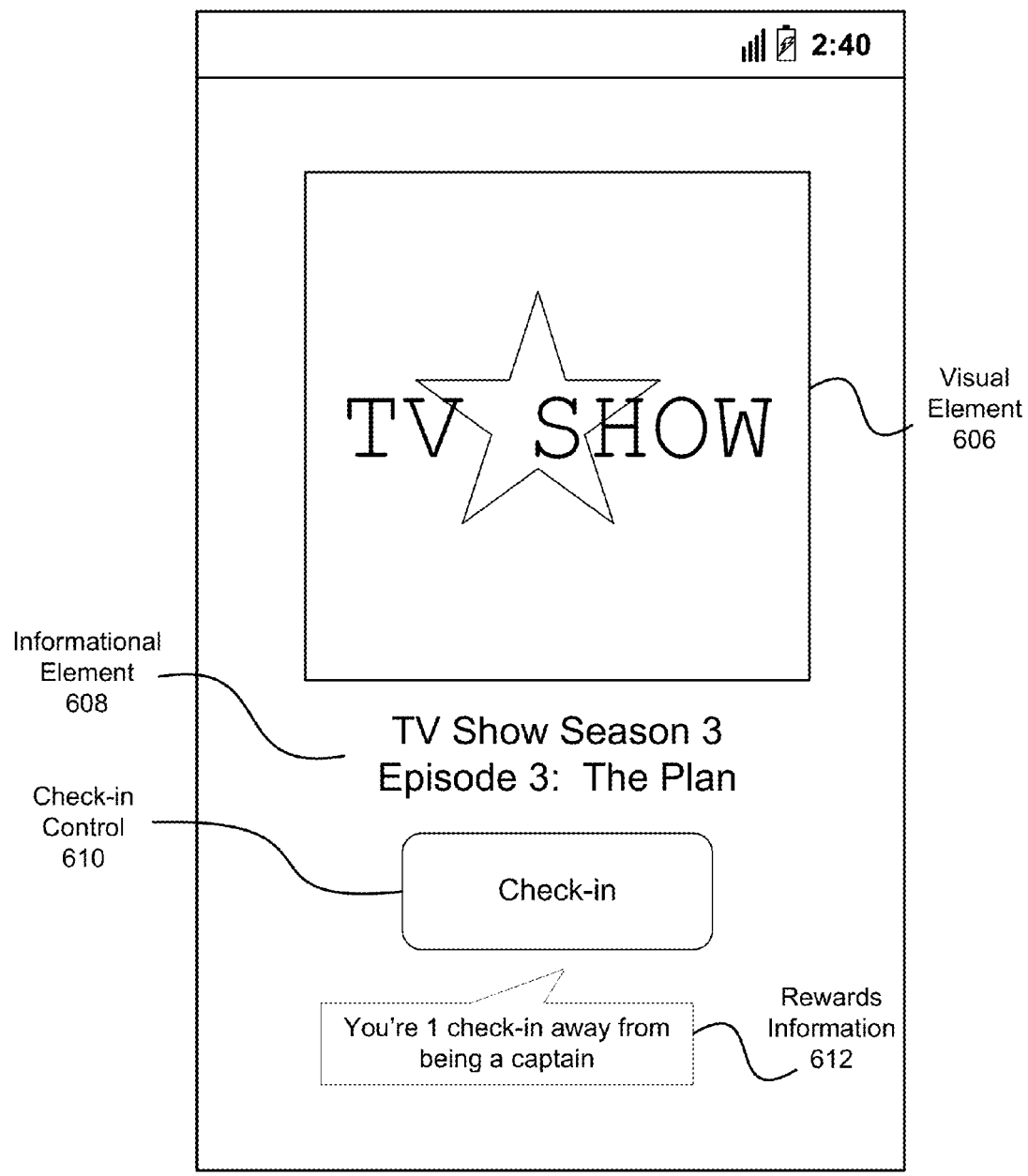

FIG. 6B illustrates the user interface 600 after a user has selected a result associated with a reward (e.g., result 602 of FIG. 6A). As shown in FIG. 6B, the user interface 600 includes a visual element 606, an informational element 608, a check-in control 610, and rewards information 612. The visual element 606 generally includes an image associated with a content item indicated by a selected result. Illustratively, in FIG. 6B, the visual element 606 displays an image of a stylized title of a television show. The informational element 608 includes information regarding a content item referenced by a result. For example, in FIG. 6B, the informational element 608 provides the season number, episode title, and episode number for a television show episode. The check-in control 610 enables a user to check-in to a content item referenced by the result. In particular, upon receiving a selection of the check-in control 610, the audio search application 122 can cause a check-in selection to be communicated to the audio recognition service for processing (e.g., rewards procurement, check-in publication, etc.) The rewards information 612 provides information regarding a reward that the user can earn if he or she checks-in to a content item. Illustratively, in FIG. 6B, the rewards information 612 indicates that the user can attain an achievement level (e.g., the level of captain) in response to checking-in. Other rewards not included in the rewards information 612 can also be earned by the user in response to checking-in. The rewards information 612 can further indicate the number of remaining check-ins needed to earn the reward. In FIG. 6B, for example, the rewards information 612 indicates that the user must check-in one more time prior to attaining a specific achievement level.

Figure 6C:
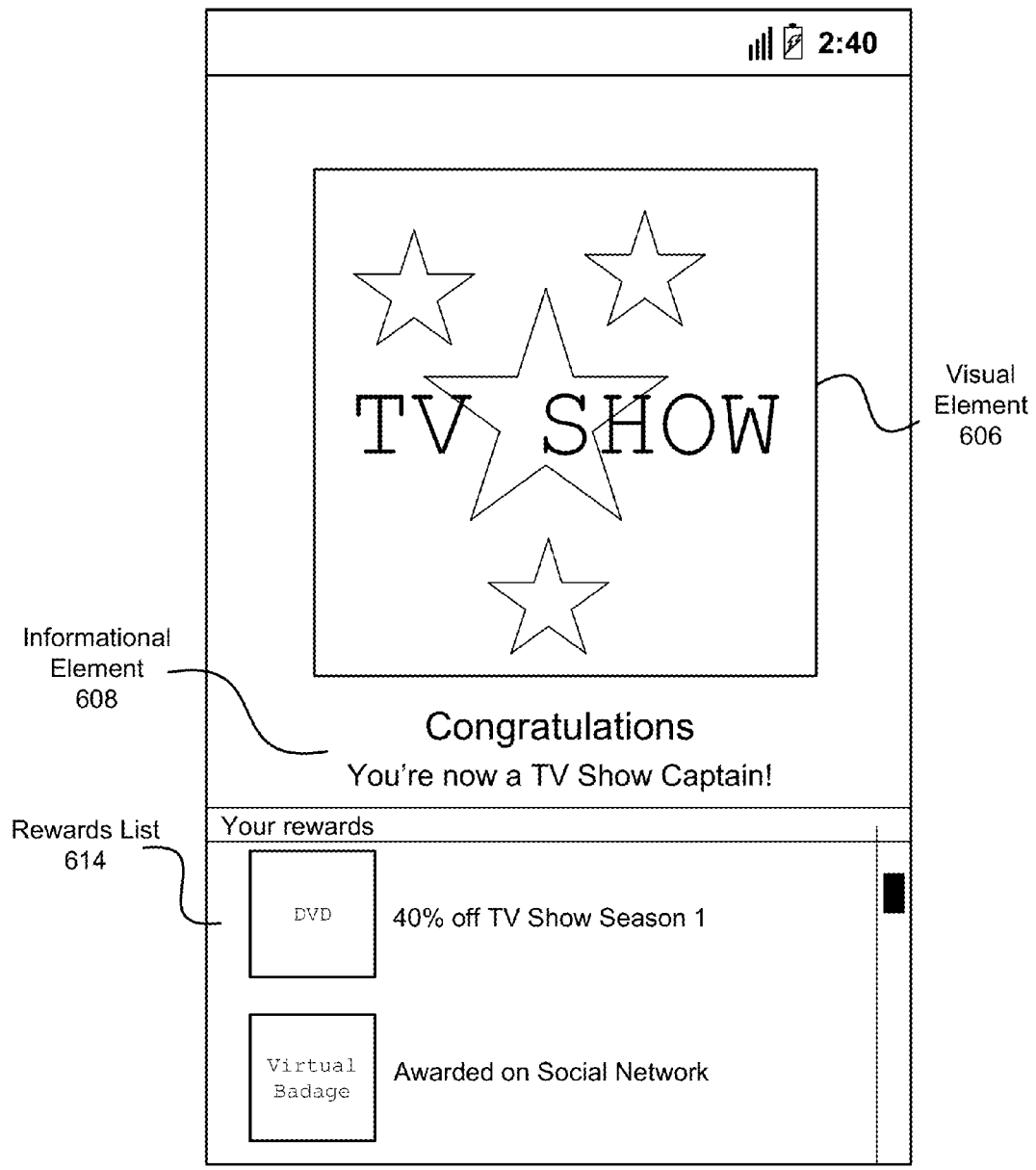

FIG. 6C illustrates the user interface 600 after a user has checked-in and earned a number of rewards. As shown in FIG. 6C, the user interface 600 includes the visual element 606, informational element 608, and rewards list 614. As in FIG. 6B, the visual element 606 can display an image associated with the content item. However, in FIG. 6C, the stylized title is changed to indicate the user's new achievement level of captain. As further shown in FIG. 6C, the informational element 608 additionally provides a text-based indication relating to the user's reward. In particular, the information element provides an indication of the user's new achievement level. The rewards list 614 can indicate the rewards that a user has earned as a result of checking-in to the content item. As shown in FIG. 6C, the rewards list 614 includes information regarding a 40% discount for a Blu-Ray collection. The rewards list 614 additionally includes information indicating that the user has earned a virtual badge. The information provided in the rewards list 614 can be text-based and/or image-based (e.g., icons, etc.). The information provided in the rewards list 614 can additionally include links to websites, online stores, online services, etc. For example, the rewards list 614 may include a reward for a discount on a Blu-Ray collection. Responsive to a selection of the reward, the audio search application 122 can cause a web browser application to be executed, and to display a page of an online store selling the Blu-Ray collection. The audio search application 122 can further communicate to the online store that the user is entitled to a discount on the collection. In one implementation, the user is awarded each of the rewards displayed in rewards list 614. In another implementation, the user can select one or more rewards from the rewards list 614 to be awarded. Illustratively, by checking-in to a television show episode 5 times, the user can become eligible to select two rewards from a set of ten rewards in the rewards list 614.

Figure 6D:
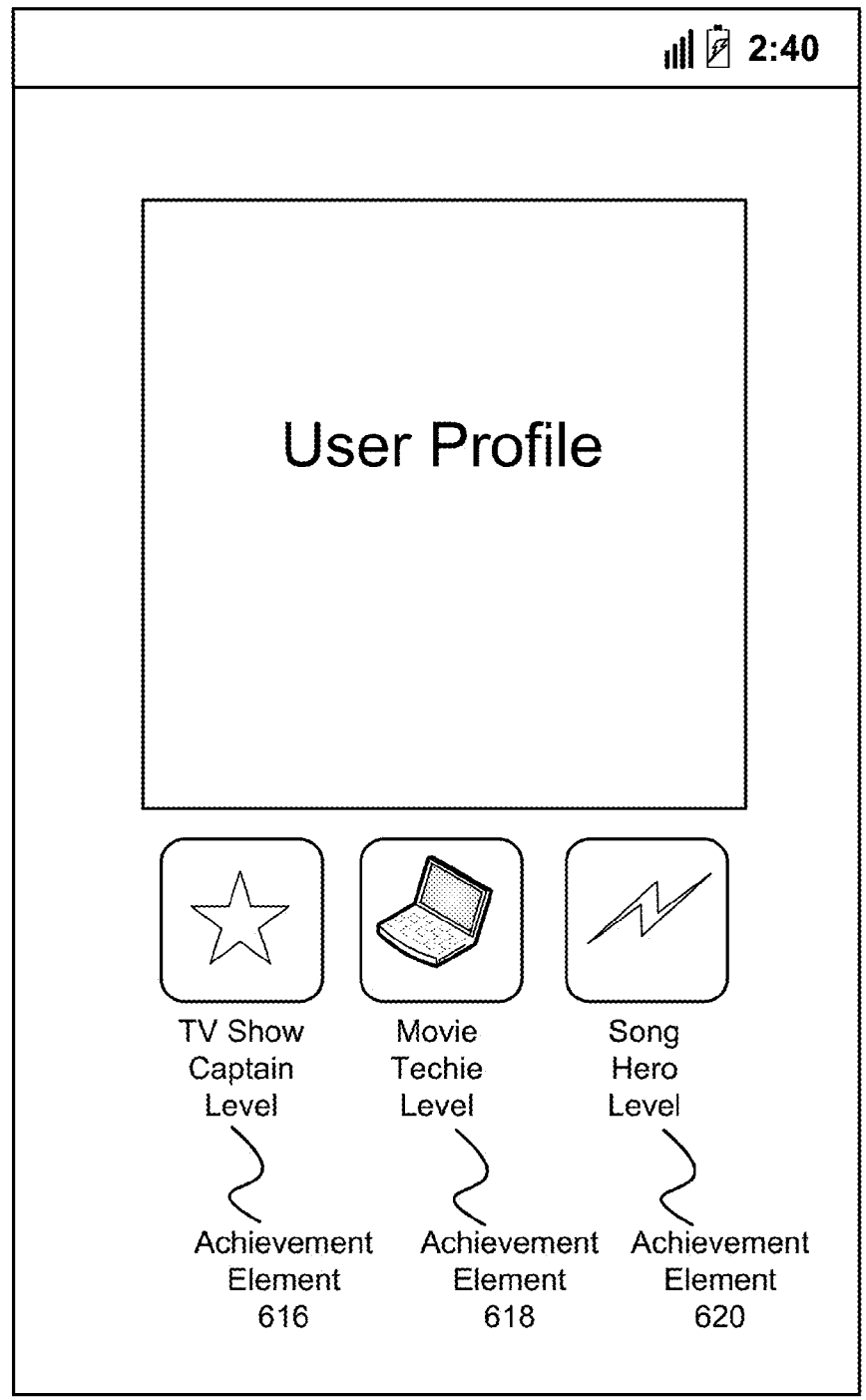

FIG. 6D illustrates a user profile provided by user interface 600. The user profile can be accessible from within the audio search application 122. As shown in FIG. 6D, the user profile includes a number of achievement elements 616, 618, and 620. The achievement element can indicate the achievement level a user has reached for a particular content item or set of content items. For example, in FIG. 6D, achievement element 616 indicates that a user has earned the achievement level of captain for a particular television show. In one implementation, the user can select an achievement level element in order to access information regarding rewards for the corresponding achievement level. In particular, responsive to a selection of the achievement level element 616, the audio search application 122 can display the user interface elements and information shown in FIG. 6C.

Additional Considerations

The present invention has been described in particular detail with respect to various embodiments, and those of skill in the art will appreciate that the invention may be practiced in other embodiments. In addition, those of skill in the art will appreciate the following aspects of the disclosure. First, the particular naming of the components, capitalization of terms, the attributes, data structures, or any other programming or structural aspect is not mandatory or significant, and the mechanisms that implement the invention or its features may have different names, formats, or protocols. Second, the system may be implemented via a combination of hardware and software, as described, or entirely in hardware elements. Third, the particular division of functionality between the various system components described herein is merely exemplary, and not mandatory; functions performed by a single system component may instead be performed by multiple components, and functions performed by multiple components may instead performed by a single component.

Some portions of above description describe the invention in terms of algorithms and symbolic representations of operations on information. These algorithmic descriptions and representations are used by those skilled in the data processing arts to most effectively convey the substance of their work to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware or hardware.

In addition, the terms used to describe various quantities, data values, and computations are understood to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or the like, refer to the action and processes of a computer system, or similar electronic computing device, that manipulates and transforms data represented as physical (electronic) quantities within the computer system memories or registers or other such information storage, transmission or display devices.

The present invention also relates to an apparatus for performing the operations herein. This apparatus may be specially constructed for the required purposes, or it may include a general-purpose computer selectively activated or reconfigured by a computer program stored in the computer. Such a computer program may be stored in a computer readable storage medium, such as, but is not limited to, any type of disk including floppy disks, optical disks, CD-ROMs, magnetic-optical disks, read-only memories (ROMs), random access memories (RAMs), EPROMs, EEPROMs, magnetic or optical cards, application specific integrated circuits (ASICs), or any type of media suitable for storing electronic instructions, and each coupled to a computer system bus. Furthermore, the computers referred to in the specification may include a single processor or may be architectures employing multiple processor designs for increased computing capability.

The algorithms and displays presented herein are not inherently related to any particular computer or other apparatus. Various general-purpose systems may also be used with programs in accordance with the teachings herein, or it may prove convenient to construct more specialized apparatus to perform the required method steps. The required structure for a variety of these systems will appear from the description above. In addition, the present invention is not described with reference to any particular programming language. It is appreciated that a variety of programming languages may be used to implement the teachings of the present invention as described herein, and any references to specific languages are provided for disclosure of enablement and best mode of the present invention.

The present invention is well-suited to a wide variety of computer network systems over numerous topologies. Within this field, the configuration and management of large networks include storage devices and computers that are communicatively coupled to dissimilar computers and storage devices over a network, such as the Internet.

Finally, it should be noted that the language used in the specification has been principally selected for readability and instructional purposes, and may not have been selected to delineate or circumscribe the inventive subject matter. Accordingly, the disclosure of the present invention is intended to be illustrative, but not limiting, of the scope of the invention, which is set forth in the following claims.

What is claimed is:

1. A system, comprising:
 a memory that stores computer executable components;
 a processor that executes at least the following computer executable components stored in the memory:
  a frontend module configured to:
   establish a first and a second network connection; and
   receive, from a device via the first network connection, a first portion of an audio sample using a hypertext transfer protocol; and
  a first recognition module configured to determine a first recognition result corresponding to the first portion of the audio sample, wherein the frontend module is further configured to send, via the second network connection, the first recognition result to the device using the hypertext transfer protocol and prior to receiving a second portion of the audio sample.

2. The system of claim 1, wherein the audio sample is derived from an audio recording made at the device.

3. The system of claim 1, wherein the audio sample contains audio having multiple content types.

4. The system of claim 3, further comprising:
 a second recognition module configured to determine a second recognition result corresponding to the first portion of the audio sample, wherein the first and second recognition results identify different content types of the first portion of the audio sample.

5. The system of claim 4, wherein the frontend module is further configured to send, via the second network connection, the second recognition result to the device prior to receiving the second portion of the audio sample.

6. The system of claim 1, wherein the first recognition module is configured to generate a first fingerprint based on the first portion of the audio sample and determine the first recognition result based on a match between the first fingerprint and a reference fingerprint in a set of reference fingerprints.

7. The system of claim 1, wherein the frontend module is further configured to receive from the device via the first network connection, a second portion of the audio sample, wherein the first recognition module or another recognition module is configured to determine a second recognition result corresponding to the second portion of the audio sample, and wherein the frontend module is configured to send, via the second network connection, the second recognition result to the device prior to receiving a third portion of the audio sample.

8. The system of claim 1, wherein the frontend recognition module is configured to send the first recognition result to the device via the second network connection based on a determination that the second network connection and the first network connection are associated with a same session identifier.

9. A device, comprising:
a memory to store executable instructions; and
a processor, coupled to the memory, that facilitates execution of the executable instructions to perform operations, comprising:
establishing a first hypertext transfer protocol connection with an audio recognition server device;
sending a first portion of an audio sample to the audio recognition server device via the first hypertext transfer connection protocol;
establishing a second hypertext transfer protocol connection with the audio recognition server device; and
receiving from the audio recognition server device, via the second hypertext transfer protocol connection, a first recognition result corresponding to the first portion of the audio sample prior to sending of a second portion of the audio sample by the device to the audio recognition server device.

10. The device of claim 9, wherein the operations further comprise recording the audio sample.

11. The device of claim 10, wherein the sending the first portion of the audio sample is performed concurrently with recording of another portion of the audio sample.

12. The device of claim 9, wherein the operations further comprise:
sending to the audio recognition server device, via the first hypertext transfer connection protocol, a second portion of the audio sample; and
receiving from the audio recognition server device, via the second hypertext transfer protocol connection, a second recognition result corresponding to the second portion of the audio sample prior to sending of a third portion of the audio sample by the device to the audio recognition server device.

13. The device of claim 9, wherein the operations further comprise:
sending, via the first hypertext transfer protocol connection, a remaining portion of the audio sample to the audio recognition server device, such that the audio sample in its entirety is received by the audio recognition server device; and
receiving, from the audio recognition server device via the first hypertext transfer protocol connection, a third recognition result corresponding to the audio sample in its entirety.

14. The device of claim 9, wherein the audio sample is associated with two or more content types and wherein the operations further comprise:
receiving, from the audio recognition server device, via the second hypertext transfer protocol connection, a second recognition result corresponding to the first portion of the audio sample, the second recognition result having a content type different from a content type of the first recognition result.

15. The device of claim 14, wherein the operations further comprise:
generating a user interface that displays the first and second recognition results; and
distinguishing the content type of the first recognition result from the content type of the second recognition result via the user interface.

16. The device of claim 15, wherein the distinguishing the content type of the first recognition result from the content type of the second recognition result using different visual indicators.

17. A method comprising:
using a processor to execute the following computer executable instructions stored in a memory to perform the following acts:
receiving from a device a first segment of an audio sample, wherein the audio sample is associated with two or more content types;
determining a first recognition result corresponding to the first segment, the first recognition result having a first content type;
determining a second recognition result corresponding to the first segment, the second recognition result having a second content type; and
sending the first recognition result and the second recognition result to the device.

18. The method of claim 17, wherein the receiving the first segment is performed over a first network connection and the sending the first and second recognition results is performed over a second network connection.

19. The method of claim 17, wherein the sending the first recognition result and the second recognition result is performed prior to receiving the audio sample in its entirety.

20. The method of claim 17, wherein the content types include at least one of a song, a movie, a television episode, and a speech.

* * * * *